US012752446B2

(12) United States Patent
Matsuda et al.

(10) Patent No.: US 12,752,446 B2
(45) Date of Patent: Oct. 6, 2026

(54) BLADE UNIT AND ELECTRIC RAZOR

(71) Applicant: Panasonic Intellectual Property Management Co., Ltd., Osaka (JP)

(72) Inventors: Misaki Matsuda, Osaka (JP); Hiroaki Shimizu, Shiga (JP); Takehiro Nakagawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 91 days.

(21) Appl. No.: 18/835,058

(22) PCT Filed: Mar. 13, 2023

(86) PCT No.: PCT/JP2023/009493

§ 371 (c)(1),
(2) Date: Aug. 1, 2024

(87) PCT Pub. No.: WO2023/189451

PCT Pub. Date: Oct. 5, 2023

(65) Prior Publication Data

US 2025/0114956 A1 Apr. 10, 2025

(30) Foreign Application Priority Data

Mar. 28, 2022 (JP) ................................ 2022-051802

(51) Int. Cl.
*B26B 19/04* (2006.01)

(52) U.S. Cl.
CPC ................................ *B26B 19/046* (2013.01)

(58) Field of Classification Search
CPC .................................................... B26B 19/046
See application file for complete search history.

(56) References Cited

U.S. PATENT DOCUMENTS 5,704,126 A 1/1998 Franke et al.
2009/0000126 A1* 1/2009 Kraus .................. B26B 19/063 30/45

(Continued)

FOREIGN PATENT DOCUMENTS

DE 1048509 B 1/1959
EP 4067017 A1 * 10/2022 ........... B26B 19/048

(Continued)

OTHER PUBLICATIONS

International Search Report of PCT application No. PCT/JP2023/009493 dated May 9, 2023.

(Continued)

*Primary Examiner* — Omar Flores Sanchez
(74) *Attorney, Agent, or Firm* — Rimon P.C.

(57) ABSTRACT

The present disclosure provides a blade unit and an electric razor with which body hair can be shaved more efficiently even when skin is uneven. Blade unit according to the present disclosure is held by main body in a state where a skin contact surface is exposed. Blade unit includes a plurality of blade blocks held by main body in such a manner that the plurality of blade blocks are disposed side by side in a first direction. The plurality of blade blocks includes: first blade block floatably held by main body; and second blade block held by main body in such a manner that the second blade block floats in a direction intersecting a float direction of first blade block.

12 Claims, 9 Drawing Sheets

(56) References Cited

U.S. PATENT DOCUMENTS

| | | | | |
|---|---|---|---|---|
| 2009/0100680 | A1* | 4/2009 | Royle | B26B 19/046<br>30/45 |
| 2018/0085934 | A1* | 3/2018 | Erndt | B26B 19/40 |
| 2018/0085936 | A1* | 3/2018 | Erndt | B26B 19/048 |
| 2018/0085937 | A1* | 3/2018 | Erndt | B26B 19/3846 |
| 2018/0085943 | A1* | 3/2018 | Bady | B26B 19/3813 |
| 2018/0085944 | A1* | 3/2018 | Bady | B26B 19/205 |
| 2019/0299433 | A1* | 10/2019 | Fuerst | B26B 19/048 |
| 2019/0299434 | A1* | 10/2019 | Fuerst | B26B 19/046 |
| 2019/0299436 | A1* | 10/2019 | Fuellgrabe | B26B 19/048 |
| 2022/0314471 | A1* | 10/2022 | Hashimoto | B26B 19/10 |
| 2024/0326272 | A1* | 10/2024 | Shimizu | B26B 19/3846 |
| 2024/0405618 | A1* | 12/2024 | Hirano | H02K 1/18 |
| 2025/0001628 | A1* | 1/2025 | Verstege | B26B 19/046 |

FOREIGN PATENT DOCUMENTS

| | | | |
|---|---|---|---|
| JP | 8-066567 | A | 3/1996 |
| JP | 10-211369 | A | 8/1998 |
| JP | 2010-136954 | | 6/2010 |
| JP | 2013-188455 | | 9/2013 |
| JP | 2017-127394 | | 7/2017 |
| JP | 2019-171034 | | 10/2019 |

OTHER PUBLICATIONS

The EPC Office Action dated Jun. 2, 2025 for the related European Patent Application No. 23779473.0.

* cited by examiner

BLADE UNIT AND ELECTRIC RAZOR

CROSS-REFERENCE TO RELATED APPLICATIONS

This application is a U.S. national stage application of the PCT International Application No. PCT/JP2023/009493 filed on Mar. 13, 2023, which claims the benefit of foreign priority of Japanese patent application No. 2022-051802 filed on Mar. 28, 2022, the contents all of which are incorporated herein by reference.

TECHNICAL FIELD

The present disclosure relates to a blade unit and an electric razor.

BACKGROUND ART

Conventionally, in the field of an electric razor, as disclosed in PTL 1, there is known a blade unit including a first cutting blade for rough shaving, a second cutting blade for finish shaving, and a third cutting blade for rough shaving.

In PTL 1, while an upper end of the second cutting blade protrudes up to a position higher than an upper end of the first cutting blade, an upper end of the third cutting blade protrudes up to a position equal to or higher than the upper end of the second cutting blade. In this way, body hair present on a user's jaw can be repeatedly and accurately cut.

CITATION LIST

Patent Literature

PTL 1: Unexamined Japanese Patent Publication No. 2010-136954

SUMMARY OF THE INVENTION

Technical Problem

When such a blade unit is used in contact with even skin, it is preferable to allow more efficient shaving of body hair.

It is therefore an object of the present disclosure to provide a blade unit and an electric razor with which body hair can be shaved more efficiently even when skin is uneven.

Solutions to Problem

A blade unit according to one aspect of the present disclosure is held by a main body in a state in which a skin contact surface is exposed. The blade unit is provided with: a plurality of blade blocks held by the main body in such a manner that the plurality of the blade blocks are disposed side by side in a first direction, wherein the plurality of blade blocks include: a first blade block floatably held by the main body; and a second blade block held by the main body in such a manner that the second blade block floats in a direction intersecting a float direction of the first blade block.

An electric razor according to one aspect of the present disclosure includes the blade unit described above.

Advantageous Effect of Invention

According to the present disclosure, it is possible to obtain a blade unit and an electric razor which are capable of more efficiently shaving body hair even when skin is uneven.

DESCRIPTION OF EMBODIMENT

Hereinafter, an exemplary embodiment will be described in detail with reference to the drawings. However, unnecessarily detailed description may be omitted. For example, a detailed description of already well-known matters or a duplicated description of a practically identical configuration may not be described.

Note that the accompanying drawings and the descriptions hereunder are provided for those skilled in the art to fully understand the present disclosure, and are not intended to limit the subject matter described in the claims in any way.

In the exemplary embodiment and its modifications described below, a direction in which a plurality of blade blocks are disposed side by side is taken as an X direction (i.e., a first direction, a front-back direction, and a shaving direction), and a direction in which each of the blade blocks extends is taken as a Y direction (i.e., a second direction and a left-right direction).

Further, an up-down direction in a state where a head cover (i.e., one element of an electric razor) is disposed such that a skin contact surface faces upward is taken as a Z direction (i.e., a third direction and an up-down direction). In the present exemplary embodiment, the skin contact surface of the blade unit is constituted by surfaces of outer blades of the plurality of blade blocks (i.e., outer surfaces), and can be approximated by a curved surface protruding outward as a whole. Therefore, in the exemplary embodiment and its modifications described below, a state in which a point protruding to an outermost side of the curved surface which approximates the skin contact surface of the blade unit is located at an uppermost part and in which a tangent plane at the point protruding to the outermost side of the curved surface which approximates the skin contact surface of the blade unit is a horizontal plane corresponds to a state in which a head (i.e., a main body) is disposed such that the skin contact surface faces upward.

In the exemplary embodiment and its modifications described below, a side of the electric razor on which a power supply switch is provided will be described as a front side in the X direction.

Exemplary Embodiment

First, a configuration of electric razor 1 will be described with reference to FIGS. 1 and 2.

Figure 1:
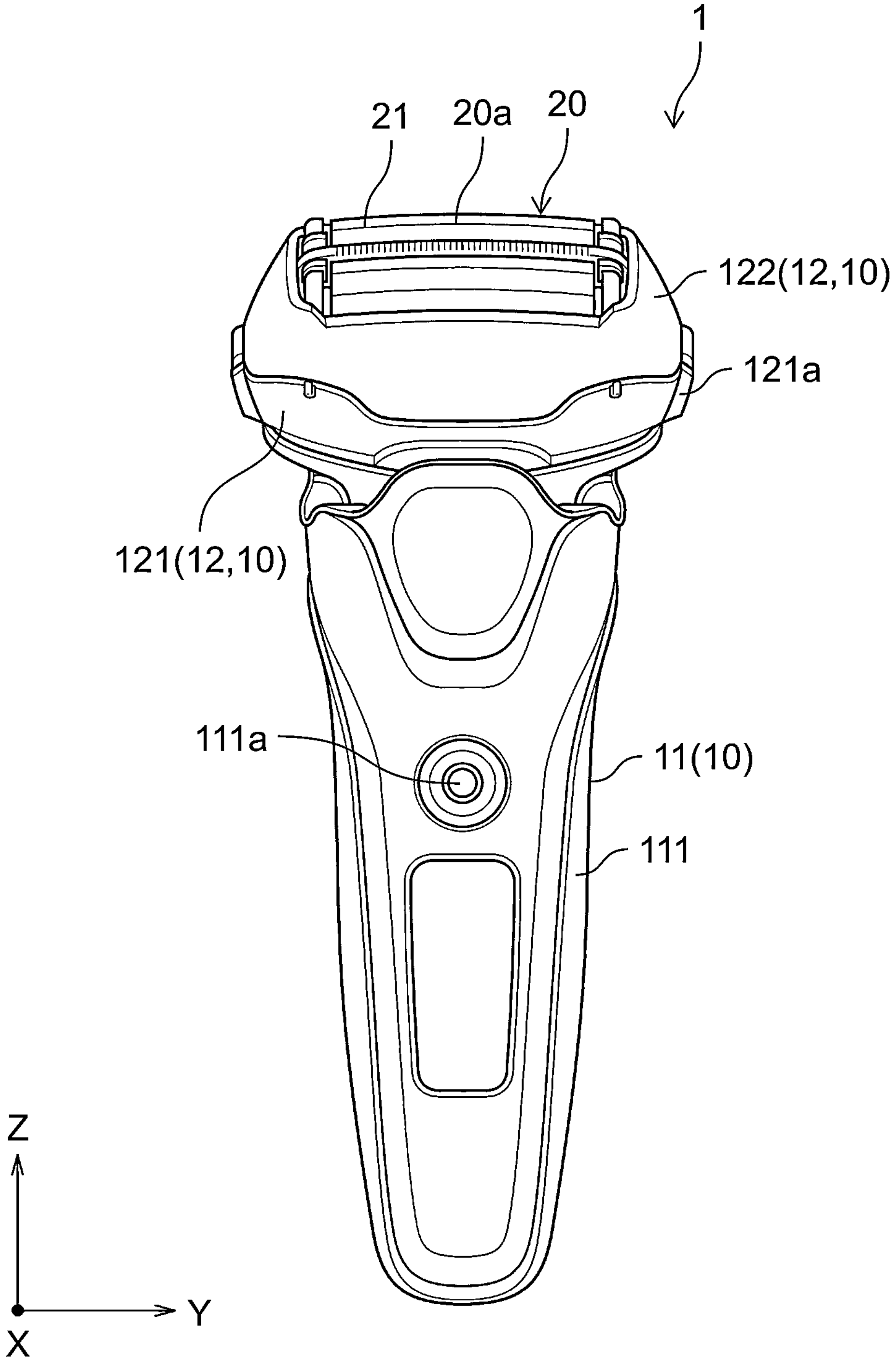
FIG. 1 is a front view illustrating the electric razor according to an exemplary embodiment.

FIG. 1 is a front view illustrating electric razor 1 according to the exemplary embodiment. FIG. 2 is a partially exploded front view of electric razor 1 according to the exemplary embodiment. As shown in FIGS. 1 and 2, electric razor 1 according to the present exemplary embodiment includes: razor body 10; and blade unit 20 that is held by razor body 10 in a state where skin contact surface **20*a*** (i.e., a surface of the outer blade of each blade block, which will be described later) is exposed.

Razor body 10 includes: grip 11 that can be held by hand, and head 12 supported by grip 11. In the present exemplary embodiment, head 12 is supported by grip 11 in a state in which an extending direction of grip 11 substantially matching with the up-down direction and in which head 12 is inclined upward and forward.

Head 12 can be swung in the Y direction with respect to grip 11 using a shaft (not illustrated) extending in the X direction as an axis. Head 12 can also be swung in the X direction with respect to grip 11 using the shaft (not illustrated) extending in the Y direction as an axis. Further, head 12 can float in the Z direction with respect to grip 11.

It is also possible to adopt a configuration in which these swings and floats are appropriately combined. For example, head 12 may be configured to be swingable in the X direction and the Y direction with respect to grip 11 and floatable in the Z direction with respect to grip 11.

Head 12 may be configured not to swing or float with respect to grip 11. Head 12 may be configured not to be inclined with respect to grip 11.

Grip 11 includes body housing 111, and a cavity is formed inside body housing 111. Various electric components such as a rechargeable battery are accommodated in the cavity formed inside body housing 111.

In addition, power supply switch **111*a* that operates (i.e., turns on and off a power supply to) electric razor 1 is provided in body housing 111. In the present exemplary embodiment, a press-type switch is exemplified as power supply switch 111*a***, but a slide switch or another switch may be used as long as the switch can turn on and off the power.

In the present exemplary embodiment, power supply switch **111*a* is provided on a front surface of body housing 111, that is, on a front face (i.e., a front surface) of electric razor 1. Note that the front face of electric razor 1 refers to a surface facing a user in a state where the user grips grip 11 of electric razor 1** during normal use.

Further, a trimmer unit may be provided at a rear part of body housing 111 (i.e., a rear part of electric razor 1).

Head 12 includes head main body 121 attached to grip 11 and head cover 122 detachably attached to head main body 121. In the present exemplary embodiment, as release buttons **121*a* that are provided at a left and a right end of head main body 121 in a retractable manner are sank inward, head cover 122 is detached from head main body 121**.

Head main body 121 accommodates a drive mechanism. Drive mechanism includes a plurality of drive poles 13, and is accommodated in head main body 121 in a state in which drive poles 13 protrude upward from head main body 121. As such a driving mechanism, for example, a conventionally known driving mechanism such as a vibration type linear actuator, a driving mechanism including a rotary motor and a conversion mechanism that converts rotational motion into reciprocating linear motion, and the like can be used.

Blade unit 20 includes three blade blocks 30 (see FIG. 3, which will be described later), and outer blade case 23, and three blade blocks 30 are disposed side by side in the X direction in a state where their longitudinal directions match with the Y direction.

As described above, in the present exemplary embodiment, each of blade blocks 30 has a predetermined length and width, and blade blocks 30 are each disposed in a state in which the length direction thereof substantially corresponds to the Y direction (i.e., the second direction and the left-right direction) of electric razor 1 and in a state in which the width direction thereof substantially corresponds to the X direction (i.e., the first direction, the front-back direction, and the shaving direction) of electric razor 1.

In the present exemplary embodiment, three blade blocks 30 include two net blade blocks 21 and one slit blade block 22.

Note that, net blade blocks 21 has a function of mainly cutting off at least one of beard in a fallen state (i.e., one kind of body hair) and beard in a short standing state (i.e., one kind of the body hair). Further, slit blade block 22 has a function of mainly cutting off thin long beard (i.e., one kind of the body hair).

In the present exemplary embodiment, one slit blade block 22 is disposed at the center in the X direction and two net blade blocks 21 are disposed on respective sides across slit blade block 22.

Figure 2:
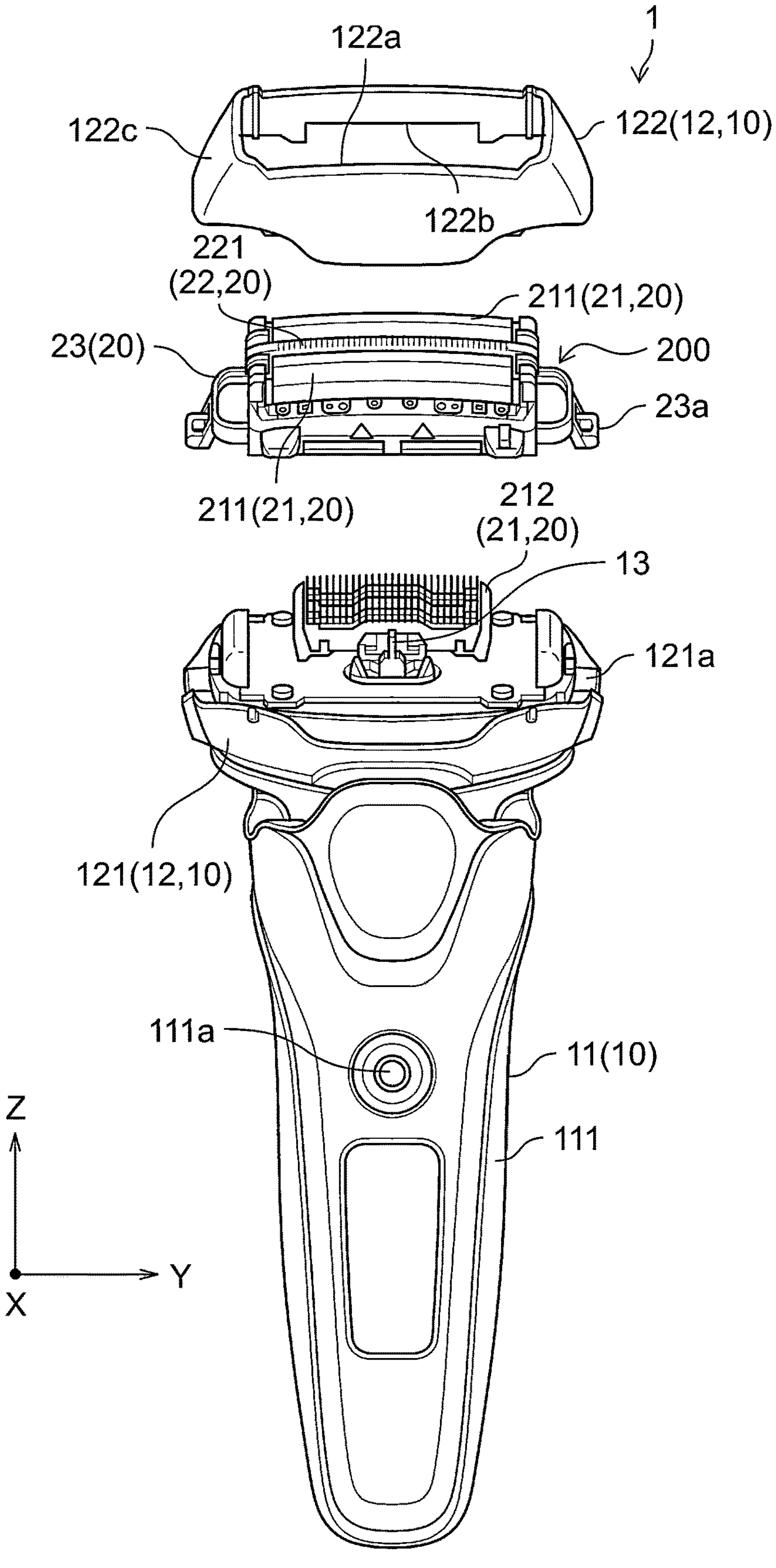
FIG. 2 is a partially exploded front view of the electric razor according to the exemplary embodiment.

As illustrated in FIG. 2, net blade blocks 21 includes first net blade 211 and first inner blade 212. In the present exemplary embodiment, first net blade 211 is provided by being curved in an inverted U shape protruding upward in side view (i.e., in a state viewed in the Y direction). When blade block 30 includes first net blade 211 having such a shape, vertex 2111 of a convex part curved in the inverted U shape corresponds to top part 31 of blade block 30 (see FIG. 3, which will be described later).

Further, first net blade 211 is provided so as to be slightly curved in the Y direction (i.e., the outer blade length direction) to protrude upward in front view (i.e., in a state viewed along the X direction). For example, many circular blade holes (not illustrated) are formed in first net blade 211. Note that, first net blade 211 may be provided without being curved to protrude upward in front view. For example, in a state where first net blade 211 is viewed from the front (i.e., in a state viewed in the X direction), a top part of first net blade 211 can be a straight line extending in the Y direction (i.e., in the outer blade length direction).

First inner blade 212 has an inverted U shape following a curved shape of first net blade 211, and is disposed inside first net blade 211 (i.e., below first net blade 211, a side opposite to a side of first net blade 211 in contact with skin S (see FIG. 4, which will be described later)). First inner blade 212 is detachably attached to one of the plurality of drive poles 13. When the power supply of electric razor 1 is turned on and drive pole 13 is driven in a state where first inner blade 212 is disposed inside first net blade 211 while first inner blade 212 is attached to drive pole 13, first inner blade 212 is displaced relatively (i.e., moved relatively, or reciprocated in the Y direction) with regard to first net blade 211 while first inner blade 212 is in sliding contact with an inner surface of first net blade 211.

Slit blade block 22 includes outer slit blade 221 and an inner slit blade (not illustrated). In the present exemplary embodiment, outer slit blade 221 is formed so as to be bent in an inverted U shape protruding upward in side view (i.e., in a state viewed in the Y direction). That is, outer slit blade 221 has substantially flat top surface 2211 (see FIG. 3, which will be described later). When blade block 30 includes outer slit blade 221 having such a shape, substantially flat top surface 2211 constitutes top part 31 of blade block 30.

Further, outer slit blade 221 is formed so as to be slightly curved in the Y direction (i.e., in the outer blade length direction) to protrude upward in front view (i.e., in a state viewed in the X direction). A plurality of blade holes each having a slit shape extending in the X direction are formed in outer slit blade 221 so as to be lined up in a state of being spaced apart in the Y direction. Note that, outer slit blade 221 may be configured not to be curved to protrude upward in front view. For example, in a state where outer slit blade 221 is viewed from the front (i.e., in a state viewed in the X direction), a top part of outer slit blade 221 can be a straight line extending in the Y direction (i.e., in the outer blade length direction). That is, outer slit blade 221 can be formed such that top surface 2211 of outer slit blade 221 constitutes a flat plane (i.e., a flat surface).

The inner slit blade, which is not illustrated, has an inverted U shape following a bent shape of outer slit blade 221, and is disposed inside outer slit blade 221 (i.e., below outer slit blade 221 and on a side opposite to a side on which outer slit blade 221 is in contact with skin S). This inner slit blade is detachably attached to one of the plurality of drive poles 13 (i.e., drive pole 13 different from the drive pole to which first inner blade 212 is attached). Further, when the power supply of electric razor 1 is turned on and drive pole 13 is driven in a state where the inner slit blade is disposed inside outer slit blade 221 while outer slit blade 221 is attached to drive pole 13, the inner slit blade is displaced relatively (i.e., moved relatively, or reciprocated in the Y direction) with regard to outer slit blade 221 while the inner slit blade is in sliding contact with an inner surface of outer slit blade 221.

As described above, electric razor 1 according to the present exemplary embodiment has a form of a reciprocating electric razor in which first inner blade 212 and the inner slit blade are reciprocated with respect to first net blade 211 and outer slit blade 221.

In the present exemplary embodiment, members other than two first inner blades 212 of three blade blocks 30 are attached to outer blade case 23 in a substantially frame shape. At this time, the members may be detachably attached to outer blade case 23, or may be attached to outer blade case 23 in a state of being undetachable.

In the present exemplary embodiment, as shown in FIG. 2, two first net blades 211 are attached to outer blade case 23 in a state where first inner blades 212 are not disposed inward, and one outer slit blade 221 is attached to outer blade case 23 in a state where the inner slit blades are disposed inward. As described above, in the present exemplary embodiment, outer blade cassette 200 is formed by attaching two first net blades 211 and one slit blade block 22 to outer blade case 23. Further, outer blade cassette 200 is detachably attached to head cover 122.

Specifically, head cover 122 includes substantially hollow-columnar peripheral wall **122*c* in which upper opening 122*a* and lower opening 122*b* are formed. Outer blade cassette 200 having the respective outer blades facing upward is inserted through lower opening 122*b* of head cover 122, and thus outer blade cassette 200 is attached to head cover 122. At this time, outer blade cassette 200 is attached to head cover 122 in a state in which a surface of each outer blade is exposed from upper opening 122*a* of head cover 122. Therefore, in the present exemplary embodiment, a portion of the surface of each outer blade exposed from upper opening 122*a* of head cover 122 constitutes skin contact surface 20*a*** that comes into contact with skin S (i.e., a skin surface) of the user.

Release buttons **23*a* are formed at the left and right ends of outer blade case 23, and release buttons 23*a* are operated to release attachment between head cover 122 and outer blade cassette 200**.

As described above, in the present exemplary embodiment, head cover 122 to which outer blade cassette 200 has been attached is attached to head main body 121 in a state in which two first inner blades 212 are attached to corresponding drive poles 13 protruding upward from head main body 121. When head cover 122 to which outer blade cassette 200 has been attached is attached to head main body 121 in a state in which two first inner blades 212 are attached to corresponding drive poles 13, two first inner blades 212 are disposed inside corresponding first net blades 211.

In this way, each inner blade is displaced (i.e., moved relatively, and reciprocated in the Y direction) with respect to the corresponding outer blade when the power supply of electric razor 1 is turned on.

Further, skin contact surface **20*a* of blade unit 20 is brought into contact with skin S of the user (i.e., the skin surface) and is moved while being slid in the X direction in a state where the power supply of electric razor 1** is turned on and each inner blade is displaced relatively to the corresponding outer blade, so that beard (i.e., an example of the body hair) inserted into the blade hole of each outer blade is cut by the outer blade and the inner blade.

As described above, in the present exemplary embodiment, head 12 corresponds to a main body that holds blade unit 20 in a state where skin contact surface 20*a* is exposed.

In the present exemplary embodiment, two net blade blocks 21 and one slit blade block 22 are attached to outer blade case 23 in a state where the blade blocks can float in the Z direction (i.e., in the up-down direction). That is, as understood from FIG. 3, which will be described later, the plurality of blade blocks 30 (as an example, three blade blocks 30) are attached to outer blade case 23 in the state where the blade blocks can float in the Z direction (i.e., in the up-down direction). In this way, when head cover 122 to which outer blade cassette 200 has been attached is attached to head main body 121, each of blade blocks 30 is floated separately and independently with respect to head 12 (i.e., the main body).

As described above, in the present exemplary embodiment, the plurality of blade blocks 30 (as an example, three blade blocks 30) includes more than or equal to three blade blocks 40 (as an example, three blade blocks 40, see FIG. 3, which will be described later) floatably held by head 12 (i.e., the main body). In this way, the outer blades can more reliably follow a shape of skin S, and it is possible to more reliably cut beard (i.e., one example of the body hair). In other words, in this way, it is possible to make skin contact surface 20*a* of blade unit 20 more reliably follow the shape of skin S, and more reliably cut beard (i.e., one example of the body hair).

Furthermore, in the present exemplary embodiment, three blade blocks 30 (i.e., three blade blocks 40) include: first blade block 41 floatably held by head 12 (i.e., the main body) (see FIG. 3, which will be described later); and second blade block 42 held by head 12 (i.e., the main body) in such a manner that second blade block 42 floats in a direction intersecting the float direction of first blade block 41 (see FIG. 3, which will be described later).

That is, three blade blocks 30 (i.e., three blade blocks 40) include first blade block 41 and second blade block 42 that float in different directions from each other.

In this way, each of first blade block 41 and second blade block 42 can be brought into contact with skin S in a state in which first blade block 41 and second blade block 42 are floated in a direction substantially perpendicular to skin S, and a force for causing first blade block 41 and second blade block 42 to float is used as a force for pressing skin S more efficiently. In this way, adhesiveness of first blade block 41 and second blade block 42 to skin S can be further improved, and the body hair can be shaved more efficiently.

Figure 3:
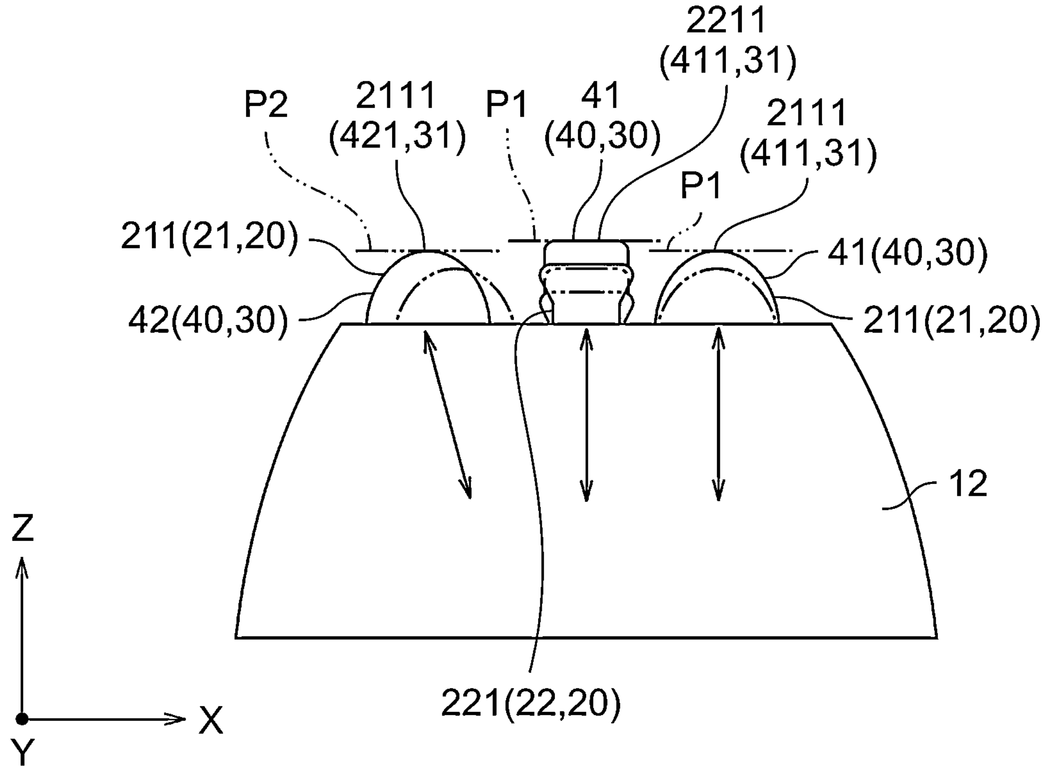
FIG. 3 is a side view schematically illustrating a floating state of a blade block with respect to a main body in the exemplary embodiment.

FIG. 3 is a side view schematically illustrating a floating state of blade block 30 with respect to head 12 (i.e., the main body) in the exemplary embodiment. In the present exemplary embodiment, three blade blocks 40 include two first blade blocks 41 that float in the vertical direction and one second blade block 42 that floats in a direction inclined with respect to the vertical direction in a state where head 12 (i.e., one element of electric razor 1) is disposed such that skin contact surface 20*a* faces upward.

Specifically, slit blade block 22 at the center and net blade block 21 on the right side in FIG. 3 are defined as first blade block 41, and net blade block 21 on the left side in FIG. 3 is defined as second blade block 42. Therefore, in the present exemplary embodiment, the plurality of blade blocks 30 (for example, three blade blocks 30) are held by head 12 (i.e., the main body) such that second blade block 42 is positioned on an outermost side in the X direction (i.e., the first direction).

The float direction of blade block 40 (i.e., second blade block 42) floatably held on the outermost side in the X direction (i.e., the first direction) is inclined with respect to a direction (i.e., the Z direction) orthogonal to the X direction (i.e., the first direction).

Here, during use of blade unit 20 (i.e., one element of electric razor 1), when blade block 40 is slid in the X direction (i.e., the first direction) while blade block 40 is brought into contact with skin S, a reaction force for pressing blade block 40 against skin S is generated by the float force of blade block 40, and a reaction force to skin S by moving blade unit 20 (i.e., one element of electric razor 1) in the X direction (i.e., the first direction) is generated.

At this time, when the float direction of blade block 40 floatably held on the outermost side in the X direction (i.e., the first direction) is assumed to be the direction (i.e., the Z direction) orthogonal to the X direction (i.e., the first direction), the direction of the reaction force applied to skin S is greatly inclined with respect to the float direction of blade block 40.

The reaction force applied to skin S is a resultant force of the reaction force generated on skin S by the float of blade block 40 and the reaction force to skin S generated by the movement of blade unit 20 (i.e., one element of electric razor 1) in the X direction (i.e., the first direction).

On the other hand, when the float direction of blade block 40 (i.e., second blade block 42) floatably held on the outermost side in the X direction (i.e., the first direction) is inclined with respect to the direction (i.e., the Z direction) orthogonal to the X direction (i.e., the first direction), the direction of the reaction force applied to skin S can be made closer to the float direction of blade block 40.

Therefore, by setting the float direction of blade block 40 (i.e., second blade block 42) floatably held on the outermost side in the X direction (i.e., the first direction) to be inclined with respect to the direction (i.e., the Z direction) orthogonal to the X direction (i.e., the first direction), it is possible to cause blade block 40 to float in a smoother manner. As a result, the force for causing blade block 40 to float can be used as the force for pressing blade block 40 against skin S more efficiently, and thus adhesiveness of second blade block 42 to skin S can be further improved. In this way, the body hair can be shaved more efficiently.

Furthermore, since it is possible to reduce the reaction force to skin S generated by moving blade unit 20 (i.e., one element of electric razor 1) in the X direction (i.e., the first direction), it is possible to more reliably reduce irritation at skin S when blade unit 20 is in use (i.e., when electric razor 1 is in use).

In the present exemplary embodiment, second blade block 42 disposed on the outermost side in the X direction (i.e., the first direction) constitutes net blade block 21.

In this way, the force for causing net blade block 21 to float can be used as the force for pressing against skin S more efficiently, and thus adhesiveness of net blade block 21 to skin S can be further improved. In this way, the function of net blade block 21 can be further exhibited.

When blade blocks 40 that float in different directions to each other are present, either one of the blade blocks may be defined as first blade block 41 and the other of the blade blocks may be defined as second blade block 42. Therefore, left net blade block 21 in FIG. 3 is defined as first blade block 41, and center slit blade block 22 and right net blade block 21 in FIG. 3 are defined as second blade block 42. However, in the following description (i.e., the present exemplary embodiment and its modifications), for convenience, in a state where head 12 (i.e., one element of electric razor 1) is disposed such that skin contact surface 20*a* faces upward, blade block 40 that floats in a direction close to the vertical direction is described as first blade block 41, and blade block 40 that floats in a direction having a large inclination angle with respect to the vertical direction is described as second blade block 42.

Further, in the present exemplary embodiment, second blade block 42 is floated in such a manner that the second blade block at a bottom dead center is brought closer to first blade block 41 than the second blade block at a top dead center. That is, when second blade block 42 is moved from the top dead center toward the bottom dead center, top part 421 of second blade block 42 moves obliquely toward a central part in the X direction. In the present exemplary embodiment, the top dead center is a position at which the blade block is farthest from the main body in a range in which the blade block is allowed to float, and the bottom dead center is a position at which the blade block is closest to the main body in the range in which the blade block is allowed to float.

In this manner, skin contact surface 20*a* of blade unit 20 can be brought closer to concave surface S1 of skin S (see FIG. 4, which will be described later).

In the present exemplary embodiment, second blade block 42 is caused to float obliquely in a state where imaginary plane P2 including top part 421 of second blade block 42 is not substantially orthogonal to the float direction of second blade block 42. Specifically, imaginary plane P2 including top part 421 of second blade block 42 constitutes a horizontal plane while second blade block 42 is floated obliquely inward in a state where head 12 (i.e., one element of electric razor 1) is disposed such that skin contact surface 20*a* faces upward.

Here, vertex 2111 of the convex part curved in the inverted U shape of net blade block 21 on the left side in FIG. 3 is top part 421 of second blade block 42, and imaginary plane P2 is a tangent plane at vertex 2111 of the convex part curved in the inverted U shape.

In the present exemplary embodiment, imaginary plane P1 including top part 411 of first blade block 41 is substantially orthogonal to the float direction of first blade block 41. Here, in the case of slit blade block 22, substantially flat top surface 2211 is top part 411 of first blade block 41, and imaginary plane P1 is a plane practically including substantially flat top surface 2211.

When skin contact surface 20*a* of blade unit 20 having such a configuration is brought into contact with skin S (i.e., the skin surface) of the user, first blade block 41 and second blade block 42 float in different directions from each other, and skin contact surface 20*a* of blade unit 20 can have a shape that follows an uneven shape of skin S.

Figure 4:
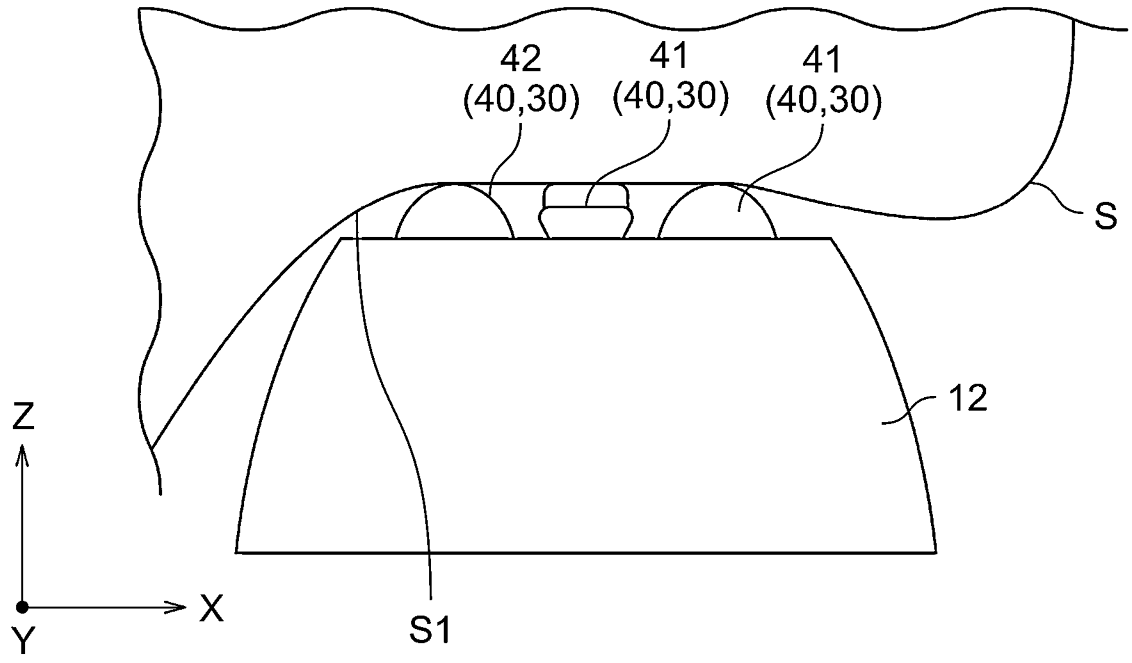
FIG. 4 is a side view schematically illustrating a state in which the blade unit according to the exemplary embodiment is brought into contact with skin while the blade unit is held by the main body.

FIG. 4 is a side view schematically illustrating a state in which blade unit 20 according to the exemplary embodiment is brought into contact with the skin while the blade unit is held by head 12 (i.e., the main body). As illustrated in FIG. 4, the shape of skin contact surface 20*a* of blade unit 20 can be brought closer to concave surface S1 of skin S. As a result, it is possible to more reliably cut the beard (i.e., one example of the body hair) in the concave curved part such as under the chin.

Note that the configuration of blade unit 20 does not need to be the configuration described in the above exemplary embodiment, and can be various configurations.

Figure 5:
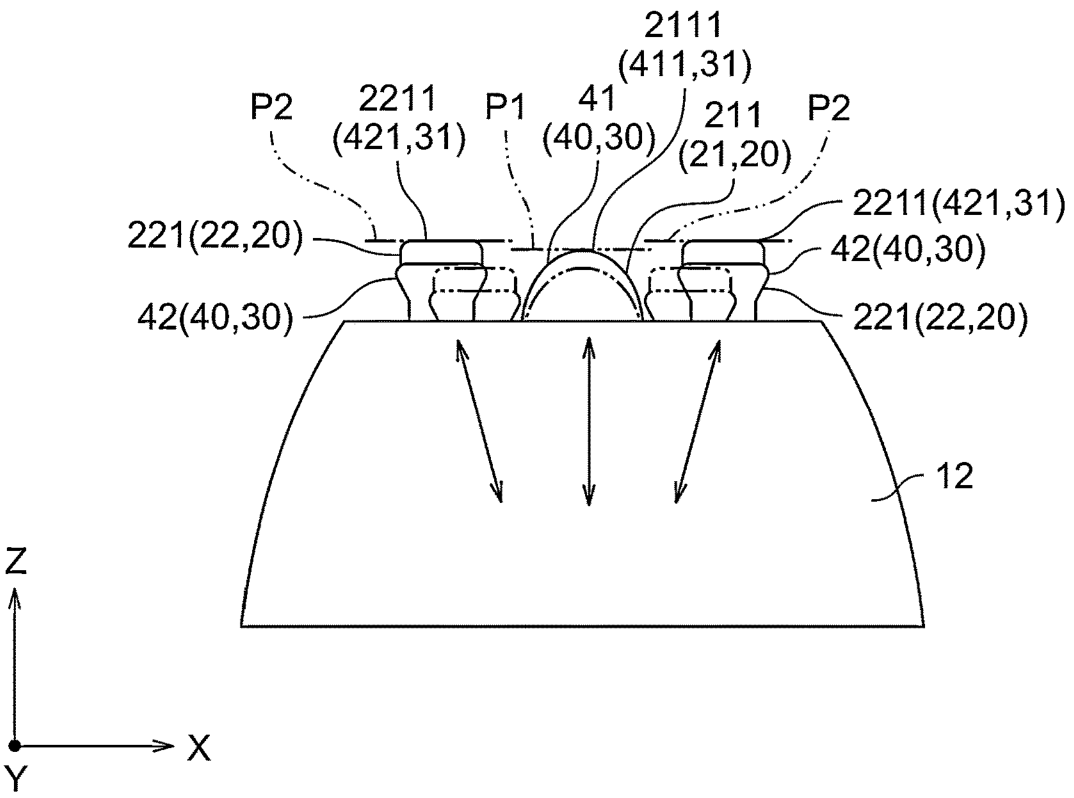
FIG. 5 is a side view schematically illustrating a floating state of the blade block with respect to the main body in a first modification.

For example, blade unit 20 illustrated in FIG. 5 can also be used. FIG. 5 is a side view schematically illustrating a floating state of blade block 30 with respect to head 12 (i.e., the main body) in a first modification.

In blade unit 20 illustrated in FIG. 5, one net blade block 21 and two slit blade blocks 22 are attached to outer blade case 23 in a state where the blade blocks can float in the Z direction (i.e., the up-down direction). That is, the plurality of blade blocks 30 (as an example, three blade blocks 30) are attached to outer blade case 23 in the state where the blade blocks can float in the Z direction (i.e., the up-down direction).

The plurality of blade blocks 30 (as an example, three blade blocks 30) includes more than or equal to three blade blocks 40 (as an example, three blade blocks 40) floatably held by head 12 (i.e., the main body).

Further, three blade blocks 30 (i.e., three blade blocks 40) include first blade block 41 floatably held by head 12 (i.e., the main body), and second blade block 42 held by head 12 (i.e., the main body) in such a manner that second blade block 42 floats in a direction intersecting the float direction of first blade block 41.

That is, three blade blocks 30 (i.e., three blade blocks 40) include first blade block 41 and second blade block 42 that float in different directions from each other.

Here, in blade unit 20 illustrated in FIG. 5, three blade blocks 40 include one first blade block 41 that floats in the vertical direction and two second blade blocks 42 that float in a direction inclined with respect to the vertical direction in a state where head 12 (i.e., one element of electric razor 1) is disposed such that skin contact surface 20*a* faces upward.

Specifically, net blade block 21 at the center in FIG. 5 is defined as first blade block 41, and slit blade blocks 22 on the left and right sides in FIG. 5 are defined as second blade blocks 42. Therefore, also in blade unit 20 illustrated in FIG. 5, the plurality of blade blocks 30 (as an example, three blade blocks 30) are held by head 12 (i.e., the main body) such that second blade blocks 42 are positioned on the outermost sides in the X direction (i.e., the first direction).

Further, the float direction of blade block 40 floatably held on the outermost side in the X direction (i.e., the first direction) corresponds to a direction inclined with respect to the direction (i.e., the Z direction) orthogonal to the X direction (i.e., the first direction).

Here, in blade unit 20 shown in FIG. 5, two second blade blocks 42 arranged on the outermost side in the X direction (i.e., the first direction) are slit blade blocks 22 each having substantially flat top surfaces 2211.

In this way, the force for causing slit blade blocks 22 to float can be used as the force for pressing against skin S more efficiently, and thus adhesiveness of slit blade blocks 22 to skin S can be further improved. In this way, the function of slit blade blocks 22 can be further exhibited.

Further, in blade unit 20 illustrated in FIG. 5, second blade block 42 is floated in such a manner that the second blade block at a bottom dead center is brought closer to first blade block 41 than the second blade block at a top dead center. That is, when second blade block 42 is moved from the top dead center toward the bottom dead center, top parts 421 of second blade blocks 42 move obliquely toward a central part in the X direction.

Specifically, when second blade block 42 on the left side in FIG. 5 is moved from the top dead center toward the bottom dead center, top part 421 of second blade block 42 moves obliquely down and right toward a central part in the X direction. Further, when second blade block 42 on the right side in FIG. 5 is moved from the top dead center toward the bottom dead center, top part 421 of second blade block 42 moves obliquely down and left toward a central part in the X direction.

As described above, in blade unit 20 illustrated in FIG. 5, in a state where skin contact surface 20*a* faces upward, the float direction of three blade blocks 40 floatably held by head 12 (i.e., the main body) is brought closer to the vertical direction from the outer side toward the inner side in the X direction (i.e., the first direction).

In this manner, skin contact surface 20*a* of blade unit 20 can be brought closer to concave surface S1 of skin S. Further, all blade blocks 40 floatably held by head 12 (i.e., the main body) can be floated more efficiently, and the force for causing all blade blocks 40 to float can be used as the force for pressing against skin S more efficiently. In this way, the body hair present on skin S having the uneven shape can be shaved more efficiently. In addition, the above-described effect can be obtained regardless of the direction in which the slit blade block is slid in the X direction (i.e., the first direction), when slit blade block 22 is slid in the X direction (i.e., the first direction) while blade block 22 is brought into contact with skin S during use of blade unit 20 (i.e., during use of electric razor 1).

Further, also in blade unit 20 illustrated in FIG. 5, second blade block 42 is caused to float obliquely in a state where imaginary plane P2 including top parts 421 of second blade blocks 42 is not substantially orthogonal to the float direction of second blade block 42. Imaginary plane P1 including top part 411 of first blade block 41 is substantially orthogonal to the float direction of first blade block 41.

When skin contact surface 20*a* of blade unit 20 having such a configuration is brought into contact with skin S (i.e., the skin surface) of the user, first blade block 41 and second blade block 42 float in different directions from each other, and skin contact surface 20*a* of blade unit 20 can have a shape that follows an uneven shape of skin S.

Figure 6:
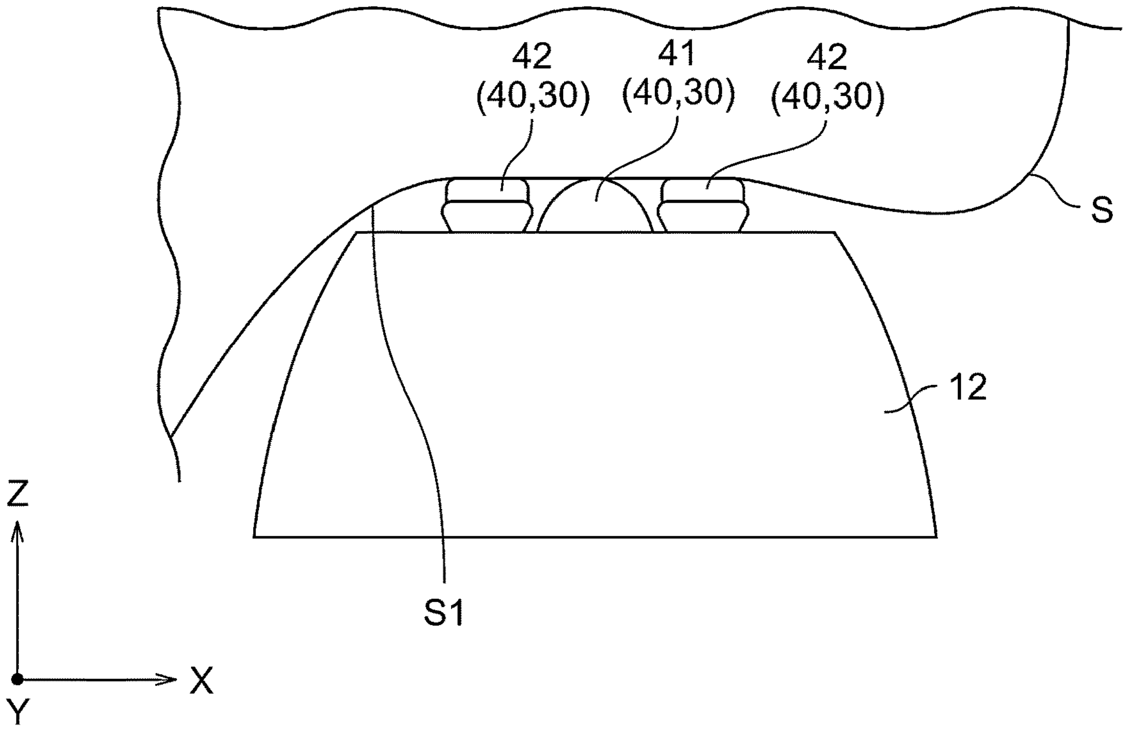
FIG. 6 is a side view schematically illustrating a state in which the blade unit according to the first modification is brought into contact with the skin while the blade unit is held by the main body.

FIG. 6 is a side view schematically illustrating a state in which blade unit 20 according to the first modification is brought into contact with the skin while blade unit 20 is held by head 12 (i.e., the main body). As illustrated in FIG. 6, the shape of skin contact surface 20*a* of blade unit 20 can be brought closer to concave surface S1 of skin S. As a result, it is possible to more reliably cut the beard (i.e., one kind of the body hair) in the concave curved part such as under the chin.

Figure 7:
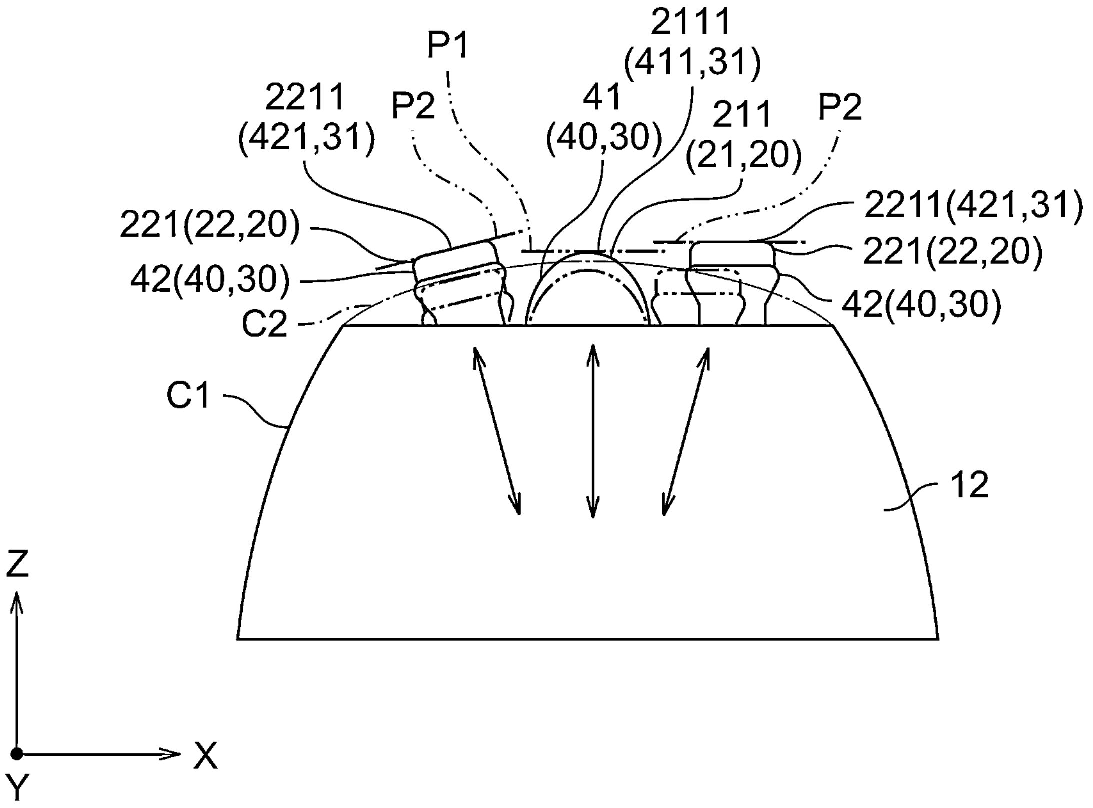
FIG. 7 is a side view schematically illustrating a floating state of the blade block with respect to the main body in a second modification.

Further, blade unit 20 illustrated in FIG. 7 can also be used. FIG. 7 is a side view schematically illustrating a floating state of blade block 30 with respect to head 12 (i.e., the main body) in a second modification.

In FIG. 7, blade unit 20 is also configured such that one net blade block 21 and two slit blade blocks 22 are attached to outer blade case 23 in a state where the blade blocks can float in the Z direction (i.e., the up-down direction). That is, the plurality of blade blocks 30 (as an example, three blade blocks 30) are attached to outer blade case 23 in the state where the blade blocks can float in the Z direction (i.e., the up-down direction).

The plurality of blade blocks 30 (as an example, three blade blocks 30) includes more than or equal to three blade blocks 40 (as an example, three blade blocks 40) floatably held by head 12 (i.e., the main body).

Further, three blade blocks 30 (i.e., three blade blocks 40) include first blade block 41 floatably held by head 12 (i.e., the main body), and second blade block 42 held by head 12 (i.e., the main body) in such a manner that second blade block 42 floats in a direction intersecting the float direction of first blade block 41.

That is, three blade blocks 30 (i.e., three blade blocks 40) include first blade block 41 and second blade block 42 that float in different directions from each other.

Further, also in blade unit 20 illustrated in FIG. 7, three blade blocks 40 include one first blade block 41 that floats in the vertical direction and two second blade blocks 42 that float in a direction inclined with respect to the vertical direction in a state where head 12 (i.e., one element of electric razor 1) is disposed such that skin contact surface 20*a* faces upward.

Specifically, net blade block 21 at the center in FIG. 7 is defined as first blade block 41, and slit blade blocks 22 on the left and right sides in FIG. 7 are defined as second blade blocks 42. Therefore, also in blade unit 20 illustrated in FIG. 7, the plurality of blade blocks 30 (as an example, three blade blocks 30) are held by head 12 (i.e., the main body) such that second blade blocks 42 are positioned on the outermost sides in the X direction (i.e., the first direction).

Further, the float direction of blade block 40 floatably held on the outermost side in the X direction (i.e., the first direction) corresponds to a direction inclined with respect to the direction (i.e., the Z direction) orthogonal to the X direction (i.e., the first direction).

Also in blade unit 20 shown in FIG. 7, two second blade blocks 42 arranged on the outermost side in the X direction (i.e., the first direction) are slit blade blocks 22 each having substantially flat top surfaces 2211.

Further, also in blade unit 20 illustrated in FIG. 7, second blade block 42 is floated in such a manner that the second blade block at a bottom dead center is brought closer to first blade block 41 than the second blade block at a top dead center. That is, when second blade block 42 is moved from the top dead center toward the bottom dead center, top parts 421 of second blade blocks 42 move obliquely toward a central part in the X direction.

Specifically, when second blade block 42 on the left side in FIG. 7 is moved from the top dead center toward the bottom dead center, top part 421 of second blade block 42 moves obliquely down and right toward a central part in the X direction. Further, when second blade block 42 on the right side in FIG. 7 is moved from the top dead center toward the bottom dead center, top part 421 of second blade block 42 moves obliquely down and left toward a central part in the X direction.

As described above, also in blade unit 20 illustrated in FIG. 7, in a state where skin contact surface 20*a* faces upward, the float direction of three blade blocks 40 floatably held by head 12 (i.e., the main body) is brought closer to the vertical direction from the outer side toward the inner side in the X direction (i.e., the first direction).

Here, in blade unit 20 illustrated in FIG. 7, imaginary plane P2 including top part 421 of second blade block 42 on the left side is substantially orthogonal to the float direction of second blade block 42.

Further, when head 12 (i.e., the main body) holding the plurality of blade blocks 30 is viewed in the direction intersecting the X direction (i.e., the first direction) and the float direction of first blade block 41, that is, viewed in the Y direction, top surface 2211 follows imaginary extension line C2 smoothly connecting outline C1 of head 12 (i.e., the main body) when slit blade block 22 (i.e., second blade block 42 on the left side in FIG. 7) is located at the bottom dead center.

In this way, it is possible to more reliably prevent corners of slit blade block 22 from abutting skin S when slit blade block 22 is slid in the X direction (i.e., the first direction) while slit blade block 22 is in contact with skin S when blade unit 20 is in use (i.e., when electric razor 1 is in use). Further, it is possible to more reliably reduce the irritation at skin S when blade unit 20 is in use (i.e., when electric razor 1 is in use).

On the other hand, second blade block 42 is caused to float obliquely in a state where imaginary plane P2 including top part 421 of second blade block 42 on the right side is not substantially orthogonal to the float direction of second blade block 42. Further, imaginary plane P1 including top part 411 of first blade block 41 is substantially orthogonal to the float direction of first blade block 41.

When skin contact surface 20*a* of blade unit 20 having such a configuration is brought into contact with skin S (i.e., the skin surface) of the user, first blade block 41 and second blade block 42 float in different directions from each other, and skin contact surface 20*a* of blade unit 20 can have a shape that follows an uneven shape of skin S.

Figure 8:
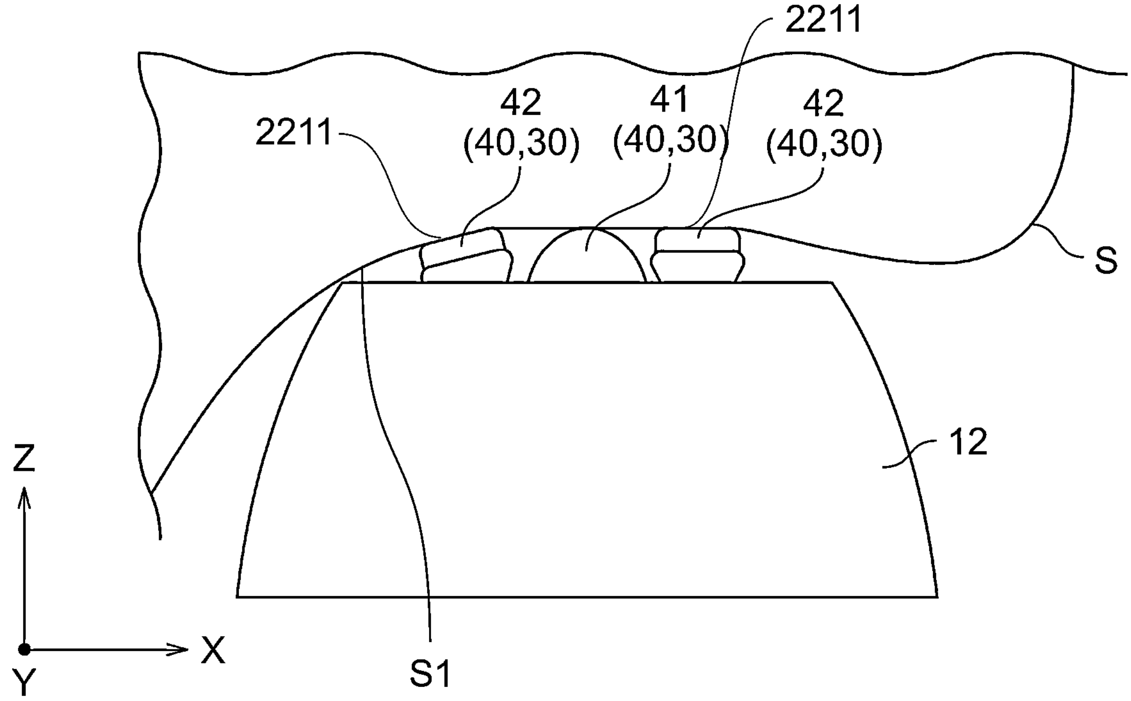
FIG. 8 is a side view schematically illustrating a state in which the blade unit according to the second modification is brought into contact with the skin while the blade unit is held by the main body.

FIG. 8 is a side view schematically illustrating a state in which blade unit 20 according to the second modification is brought into contact with the skin while blade unit 20 is held by head 12 (i.e., the main body). As illustrated in FIG. 8, the shape of skin contact surface 20*a* of blade unit 20 can be brought closer to concave surface S1 of skin S. As a result, it is possible to more reliably cut the beard (i.e., one kind of the body hair) in the concave curved part such as under the chin.

At this time, since top surface 2211, which is top part 421 of second blade block 42 on the left side, is a surface inclined with respect to the horizontal plane, top surface 2211 can be brought into surface contact with skin S in a state close to concave surface S1 of skin S. Therefore, as compared with a case where top surface 2211 is horizontal, it is possible to suppress formation of a gap between skin S and top surface 2211 when blade unit 20 is in use (i.e., when electric razor 1 is in use), and it is possible to more reliably cut the beard (i.e., one example of the body hair) in the concave curved part such as under the chin.

Figure 9:
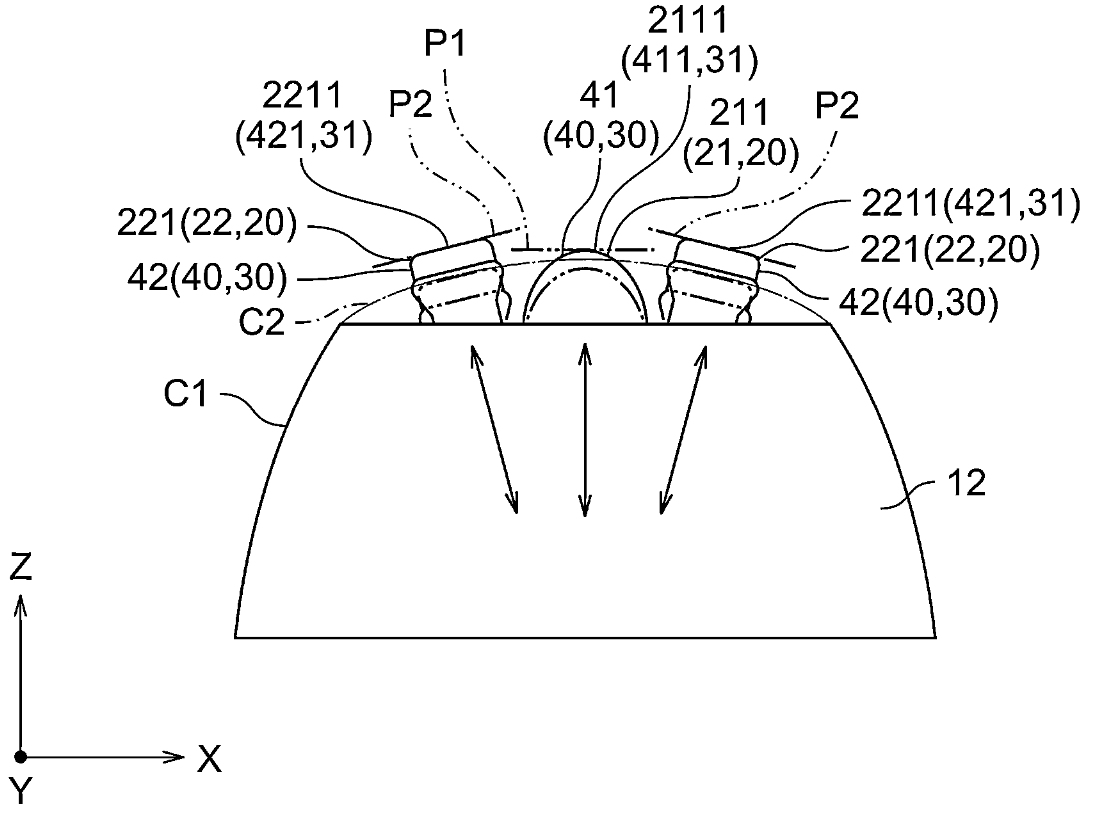
FIG. 9 is a side view schematically illustrating a floating state of the blade block with respect to the main body in a third modification.

Further, blade unit 20 illustrated in FIG. 9 can also be used. FIG. 9 is a side view schematically illustrating a floating state of blade block 30 with respect to the main body in a third modification.

Also in blade unit 20 illustrated in FIG. 9, one net blade block 21 and two slit blade blocks 22 are attached to outer blade case 23 in a state where the blade blocks can float in the Z direction (i.e., the up-down direction). That is, the plurality of blade blocks 30 (as an example, three blade blocks 30) are attached to outer blade case 23 in the state where the blade blocks can float in the Z direction (i.e., the up-down direction).

The plurality of blade blocks 30 (as an example, three blade blocks 30) includes more than or equal to three blade blocks 40 (as an example, three blade blocks 40) floatably held by head 12 (i.e., the main body).

Further, three blade blocks 30 (i.e., three blade blocks 40) include first blade block 41 floatably held by head 12 (i.e., the main body), and second blade block 42 held by head 12 (i.e., the main body) in such a manner that second blade block 42 floats in a direction intersecting the float direction of first blade block 41.

That is, three blade blocks 30 (i.e., three blade blocks 40) include first blade block 41 and second blade block 42 that float in different directions from each other.

Further, also in blade unit 20 illustrated in FIG. 9, three blade blocks 40 include one first blade block 41 that floats in the vertical direction and two second blade blocks 42 that float in a direction inclined with respect to the vertical direction in a state where head 12 (i.e., one element of electric razor 1) is disposed such that skin contact surface 20*a* faces upward.

Specifically, net blade block 21 at the center in FIG. 9 is defined as first blade block 41, and slit blade blocks 22 on the left and right sides in FIG. 9 are defined as second blade blocks 42. Therefore, also in blade unit 20 illustrated in FIG. 9, the plurality of blade blocks 30 (as an example, three blade blocks 30) are held by head 12 (i.e., the main body) such that second blade blocks 42 are positioned on the outermost sides in the X direction (i.e., the first direction).

Further, the float direction of blade block 40 floatably held on the outermost side in the X direction (i.e., the first direction) corresponds to a direction inclined with respect to the direction (i.e., the Z direction) orthogonal to the X direction (i.e., the first direction).

Also in blade unit 20 shown in FIG. 9, two second blade blocks 42 arranged on the outermost side in the X direction (i.e., the first direction) are slit blade blocks 22 each having substantially flat top surfaces 2211.

Further, also in blade unit 20 illustrated in FIG. 9, second blade block 42 is floated in such a manner that the second blade block at a bottom dead center is brought closer to first blade block 41 than the second blade block at a top dead center. That is, when second blade block 42 is moved from the top dead center toward the bottom dead center, top parts 421 of second blade blocks 42 move obliquely toward a central part in the X direction.

Specifically, when second blade block 42 on the left side in FIG. 9 is moved from the top dead center toward the bottom dead center, top part 421 of second blade block 42 moves obliquely down and right toward a central part in the X direction. Further, when second blade block 42 on the right side in FIG. 9 is moved from the top dead center toward the bottom dead center, top part 421 of second blade block 42 moves obliquely down and left toward a central part in the X direction.

As described above, also in blade unit 20 illustrated in FIG. 9, in a state where skin contact surface 20*a* faces upward, the float direction of three blade blocks 40 floatably held by head 12 (i.e., the main body) is brought closer to the vertical direction from the outer side toward the inner side in the X direction (i.e., the first direction).

Here, in blade unit 20 illustrated in FIG. 9, imaginary planes P2 including top parts 421 of second blade blocks 42 on the left and right sides is substantially orthogonal to the float direction of second blade block 42.

Furthermore, when head 12 (i.e., the main body) holding the plurality of blade blocks 30 is viewed in the direction intersecting the X direction (i.e., the first direction) and the float direction of first blade block 41, that is, viewed in the Y direction, top surface 2211 follows imaginary extension line C2 smoothly connecting outline C1 of head 12 (i.e., the main body) when slit blade block 22 (i.e., second blade block 42 on both left and right sides in FIG. 9) is located at the bottom dead center.

In this way, it is possible to more reliably prevent corners of slit blade block 22 from abutting skin S regardless of the direction when slit blade block 22 is slid in the X direction (i.e., the first direction) while slit blade block 22 is in contact with skin S when blade unit 20 is in use (i.e., when electric razor 1 is in use).

Further, in blade unit 20 illustrated in FIG. 9, when head 12 (i.e., the main body) holding the plurality of blade blocks 30 (as an example, three blade blocks 30) is viewed in the direction (i.e., the Y direction) intersecting the X direction (i.e., the first direction) and the float direction of first blade block 41, each of top parts 31 of the plurality of blade blocks 30 (as an example, three blade blocks 30) is present along imaginary extension line C2 smoothly connecting outline C1 of head 12 (i.e., the main body) when more than or equal to three blade blocks 40 (as an example, three blade blocks 40) floatably held by head 12 (i.e., the main body) are located at the bottom dead center.

In this way, all blade blocks 40 floatably held by head 12 (i.e., the main body) can follow the uneven shape of skin S when blade unit 20 is in use (i.e., when electric razor 1 is in use). Further, it is possible to bring all blade blocks 40 into closer contact with skin S, and to more efficiently shave the body hair even when skin S is uneven.

Further, imaginary plane P1 including top part 411 of first blade block 41 is also substantially orthogonal to the float direction of first blade block 41.

When skin contact surface 20*a* of blade unit 20 having such a configuration is brought into contact with skin S (i.e., the skin surface) of the user, first blade block 41 and second blade block 42 float in different directions from each other, and skin contact surface 20*a* of blade unit 20 can have a shape that follows an uneven shape of skin S.

Figure 10:
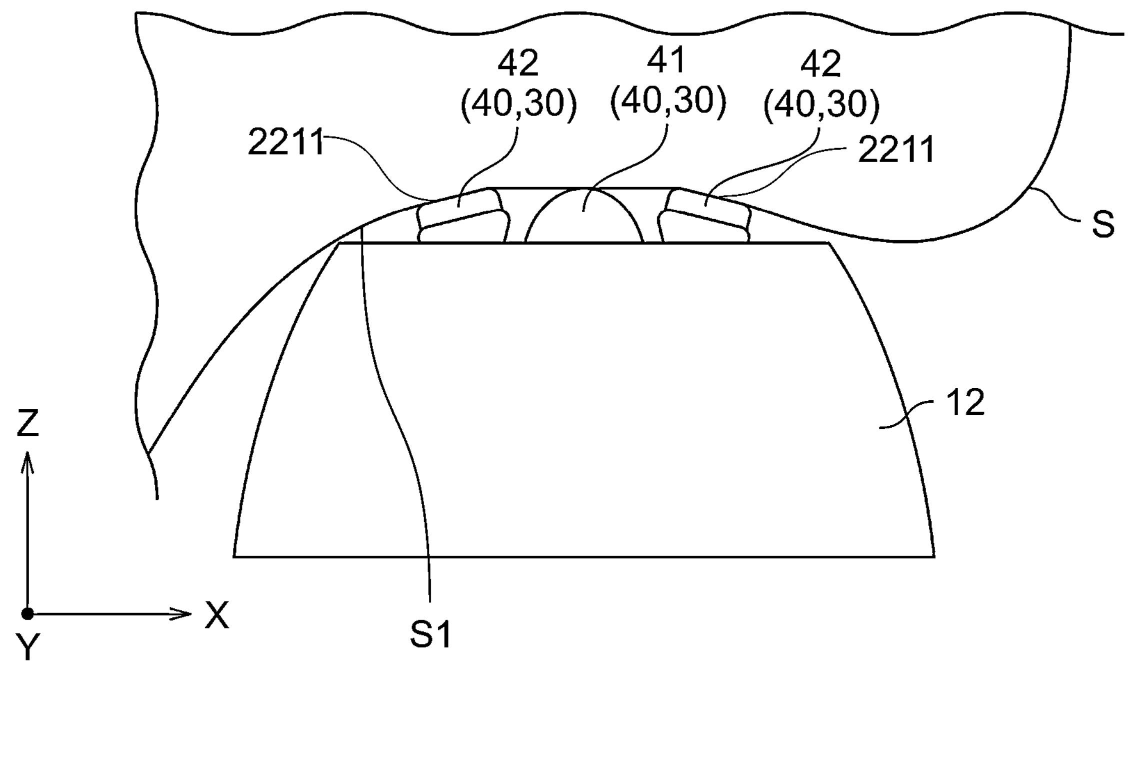
FIG. 10 is a side view schematically illustrating a state in which the blade unit according to the third modification is brought into contact with the skin while the blade unit is held by the main body.

FIG. 10 is a side view schematically illustrating a state in which blade unit 20 according to the third modification is brought into contact with the skin while blade unit 20 is held by head 12 (i.e., the main body). As illustrated in FIG. 10, the shape of skin contact surface 20*a* of blade unit 20 can be brought closer to concave surface S1 of skin S. As a result, it is possible to more reliably cut the beard (i.e., one example of the body hair) in the concave curved part such as under the chin.

At this time, since top surfaces 2211, which are top parts 421 of second blade blocks 42 on the left and right sides, are surfaces inclined with respect to the horizontal plane, top surfaces 2211 can be brought into surface contact with skin S in a state close to concave surface S1 of skin S. Therefore, as compared with the case where top surface 2211 is horizontal, it is possible to suppress formation of a gap between skin S and top surface 2211 when blade unit 20 is in use (i.e., when electric razor 1 is in use), and it is possible to more reliably cut the beard (i.e., one example of the body hair) in the concave curved part such as under the chin.

Figure 11:
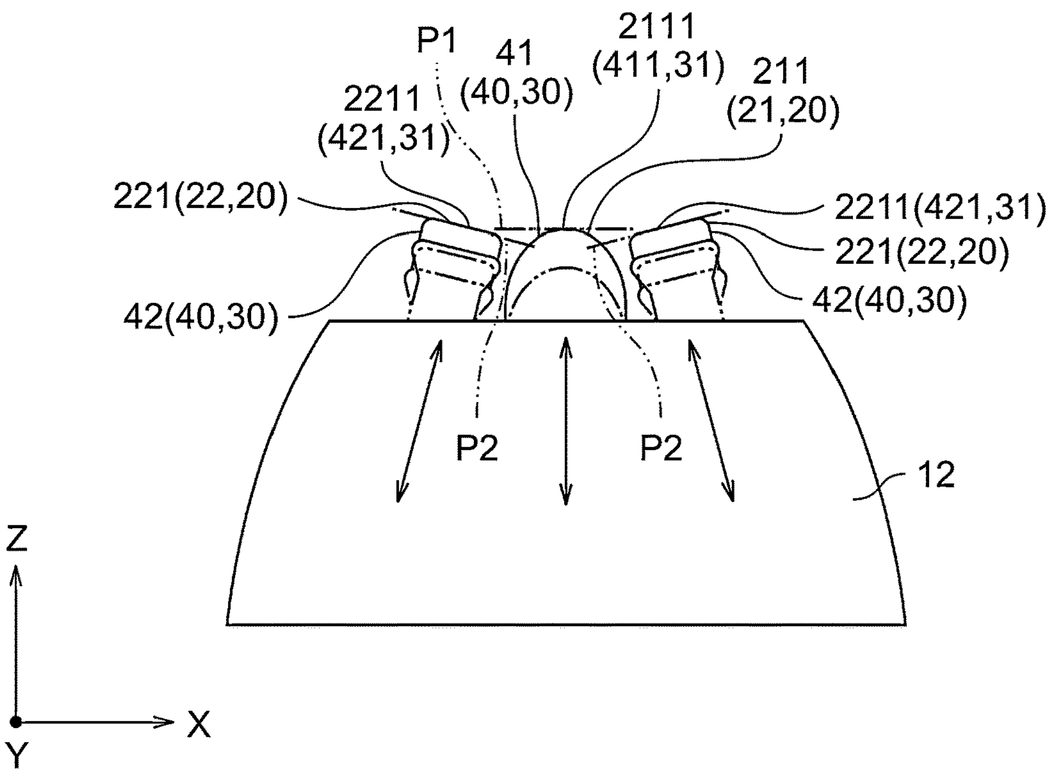
FIG. 11 is a side view schematically illustrating a floating state of the blade block with respect to the main body in a fourth modification.

Further, blade unit 20 illustrated in FIG. 11 can also be used. FIG. 11 is a side view schematically illustrating a floating state of blade block 22 with respect to head 12 (i.e., the main body) in a fourth modification.

Also in blade unit 20 illustrated in FIG. 11, one net blade block 21 and two slit blade blocks 22 are attached to outer blade case 23 in a state where the blade blocks can float in the Z direction (i.e., the up-down direction). That is, the plurality of blade blocks 30 (as an example, three blade blocks 30) are attached to outer blade case 23 in the state where the blade blocks can float in the Z direction (i.e., the up-down direction).

The plurality of blade blocks 30 (as an example, three blade blocks 30) includes more than or equal to three blade blocks 40 (as an example, three blade blocks 40) floatably held by head 12 (i.e., the main body).

Further, three blade blocks 30 (i.e., three blade blocks 40) include first blade block 41 floatably held by head 12 (i.e., the main body), and second blade block 42 held by head 12 (i.e., the main body) in such a manner that second blade block 42 floats in a direction intersecting the float direction of first blade block 41.

That is, three blade blocks 30 (i.e., three blade blocks 40) include first blade block 41 and second blade block 42 that float in different directions from each other.

Further, also in blade unit 20 illustrated in FIG. 11, three blade blocks 40 include one first blade block 41 that floats in the vertical direction and two second blade blocks 42 that float in a direction inclined with respect to the vertical direction in a state where head 12 (i.e., one element of electric razor 1) is disposed such that skin contact surface 20*a* faces upward.

Specifically, net blade block 21 at the center in FIG. 11 is defined as first blade block 41, and slit blade blocks 22 on the left and right sides in FIG. 11 are defined as second blade blocks 42. Therefore, also in blade unit 20 illustrated in FIG. 11, the plurality of blade blocks 30 (as an example, three blade blocks 30) are held by head 12 (i.e., the main body) such that second blade blocks 42 are positioned on the outermost sides in the X direction (i.e., the first direction).

Further, the float direction of blade block 40 floatably held on the outermost side in the X direction (i.e., the first direction) corresponds to a direction inclined with respect to the direction (i.e., the Z direction) orthogonal to the X direction (i.e., the first direction).

Also in blade unit 20 shown in FIG. 11, two second blade blocks 42 arranged on the outermost side in the X direction (i.e., the first direction) are slit blade blocks 22 each having substantially flat top surfaces 2211.

Here, in blade unit 20 illustrated in FIG. 11, second blade block 42 is floated in such a manner that the second blade block 42 at the top dead center is brought closer to first blade block 41 than the second blade block 42 at the bottom dead center. That is, when second blade block 42 is moved from the top dead center toward the bottom dead center, top parts 421 of second blade blocks 42 move obliquely outward in the X direction.

Specifically, when second blade block 42 on the left side in FIG. 11 is moved from the top dead center toward the bottom dead center, top part 421 of second blade block 42 moves obliquely down and left outward in the X direction. Further, when second blade block 42 on the right side in FIG. 11 is moved from the top dead center toward the bottom dead center, top part 421 of second blade block 42 obliquely moves obliquely down and right outward in the X direction.

As described above, also in blade unit 20 illustrated in FIG. 11, in a state where skin contact surface 20*a* faces upward, the float direction of three blade blocks 40 floatably held by head 12 (i.e., the main body) is brought closer to the vertical direction from the outer side toward the inner side in the X direction (i.e., the first direction).

In addition, also in blade unit 20 illustrated in FIG. 11, imaginary planes P2 including top parts 421 of second blade blocks 42 on the left and right sides is substantially orthogonal to the float direction of second blade block 42.

Further, imaginary plane P1 including top part 411 of first blade block 41 is also substantially orthogonal to the float direction of first blade block 41.

When skin contact surface 20*a* of blade unit 20 having such a configuration is brought into contact with skin S (i.e., the skin surface) of the user, first blade block 41 and second blade block 42 float in different directions from each other, and skin contact surface 20*a* of blade unit 20 can have a shape that follows an uneven shape of skin S.

Figure 12:
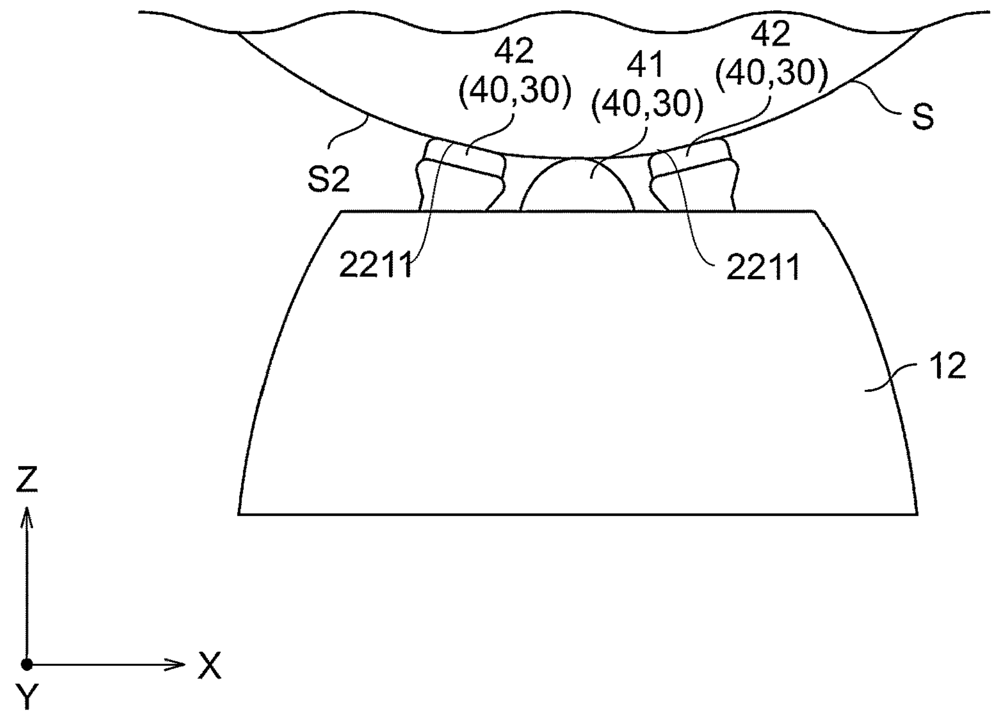
FIG. 12 is a side view schematically illustrating a state in which the blade unit according to the fourth modification is brought into contact with the skin while the blade unit is held by the main body.

FIG. 12 is a side view schematically illustrating a state in which blade unit 20 according to the fourth modification is brought into contact with the skin while being held by head 12 (i.e., the main body). As illustrated in FIG. 12, the shape of skin contact surface 20*a* of blade unit 20 can be brought closer to convex surface S2 of skin S. As a result, it is possible to more reliably cut the beard (i.e., one example of the body hair) in the convex curved part such as a protruding part at chin.

At this time, since top surfaces 2211, which are top parts 421 of second blade blocks 42 on the left and right, are surfaces inclined with respect to the horizontal plane, top surfaces 2211 can be brought into surface contact with skin S in a state close to convex surface S2 of skin S. Therefore, as compared with the case where top surface 2211 is horizontal, it is possible to suppress formation of a gap between skin S and top surface 2211 when blade unit 20 is in use (i.e., when electric razor 1 is in use), and it is possible to more reliably cut the beard (i.e., one example of the body hair) in the convex curved part such as a protruding part at the chin.

Figure 13:
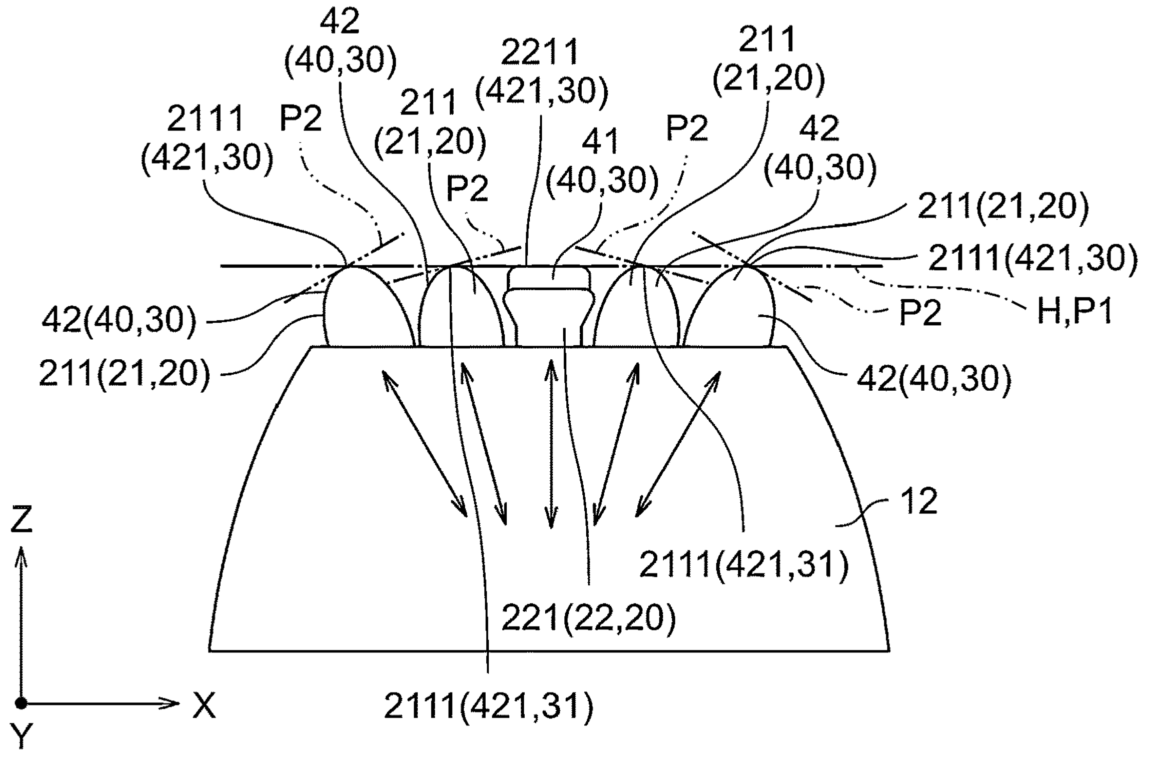
FIG. 13 is a side view schematically illustrating a floating state of the blade block with respect to the main body in a fifth modification.

Further, blade unit 20 illustrated in FIG. 13 can also be used. FIG. 13 is a side view schematically illustrating a floating state of blade block 22 with respect to head 12 (i.e., the main body) in a fifth modification.

In blade unit 20 illustrated in FIG. 13, four net blade blocks 21 and one slit blade block 22 are attached to outer blade case 23 in a state where the blade blocks can float in the Z direction (i.e., the up-down direction). That is, the plurality of blade blocks 30 (as an example, five blade blocks 30) are attached to outer blade case 23 in a state where the blade blocks can float in the Z direction (i.e., the up-down direction).

The plurality of blade blocks 30 (i.e., five blade blocks 30) includes more than or equal to three blade blocks 40 (as an example, five blade blocks 40) floatably held by head 12 (i.e., the main body).

Further, five blade blocks 30 (i.e., five blade blocks 40) include first blade block 41 floatably held by head 12 (i.e., the main body), and second blade block 42 held by head 12 (i.e., the main body) in such a manner that second blade block 42 floats in a direction intersecting the float direction of first blade block 41.

That is, five blade blocks 30 (i.e., five blade blocks 40) include first blade block 41 and second blade block 42 that float in different directions from each other.

Further, in blade unit 20 illustrated in FIG. 13, five blade blocks 40 include one first blade block 41 that floats in the vertical direction and four second blade blocks 42 that float in a direction inclined with respect to the vertical direction in a state where head 12 (i.e., one element of electric razor 1) is disposed such that skin contact surface **20*a*** faces upward.

Specifically, slit blade block 22 at the center in FIG. 13 is defined as first blade block 41, and four net blade blocks 21 on the left and right sides in FIG. 13 are defined as second blade blocks 42. Therefore, in blade unit 20 illustrated in FIG. 13, the plurality of blade blocks 30 (as an example, five blade blocks 30) are held by head 12 (i.e., the main body) such that second blade blocks 42 are positioned on the outermost sides in the X direction (i.e., the first direction).

Further, the float direction of blade block 40 floatably held on the outermost side in the X direction (i.e., the first direction) corresponds to a direction inclined with respect to the direction (i.e., the Z direction) orthogonal to the X direction (i.e., the first direction).

In blade unit 20 shown in FIG. 13, second blade block 42 disposed on the outermost side in the X direction (i.e., the first direction) constitutes net blade block 21.

Further, also in blade unit 20 illustrated in FIG. 13, second blade block 42 is floated in such a manner that the second blade block 42 at a bottom dead center is brought closer to first blade block 41 than the second blade block 42 at a top dead center. That is, when second blade block 42 is moved from the top dead center toward the bottom dead center, top parts 421 of second blade blocks 42 move obliquely toward a central part in the X direction.

Specifically, when two second blade blocks 42 on the left side in FIG. 13 are moved from the top dead center toward the bottom dead center, top parts 421 of second blade blocks 42 move obliquely down and right toward the central part in the X direction. Further, when two second blade blocks 42 on the right side in FIG. 13 are moved from the top dead center toward the bottom dead center, top parts 421 of second blade blocks 42 move obliquely down and left toward the central part in the X direction.

Further, second blade block 42 disposed between second blade block 42 on the outermost side in the X direction (i.e., the first direction) and first blade block 41 is caused to float obliquely in a state where second blade block 42 disposed between second blade block 42 on the outermost side in the X direction (i.e., the first direction) and first blade block 41 is closer to the vertical direction than second blade block 42 on the outermost side in the X direction (i.e., the first direction).

As described above, also in blade unit 20 illustrated in FIG. 13, in a state where skin contact surface **20*a* faces upward, the float direction of five blade blocks 40 floatably held by head 12** (i.e., the main body) is brought closer to the vertical direction from the outer side toward the inner side in the X direction (i.e., the first direction).

Further, in blade unit 20 illustrated in FIG. 13, imaginary planes P2 including top parts 421 of four second blade blocks 42 on the left and right sides are substantially orthogonal to the float direction of second blade block 42. Further, imaginary plane P1 including top part 411 of first blade block 41 is also substantially orthogonal to the float direction of first blade block 41.

Here, in blade unit 20 illustrated in FIG. 13, in a state where head 12 (i.e., the main body) holding five blade blocks 40 is viewed along the direction (i.e., Y direction) intersecting the X direction (i.e., the first direction) and the float direction of first blade block 41, when five blade blocks 30 floatably held by head 12 (i.e., the main body) are located at the bottom dead center, each of top parts 31 of five blade blocks 30 follows horizontal plane H.

When skin contact surface **20*a* of blade unit 20 having such a configuration is brought into contact with skin S (i.e., the skin surface) of the user, first blade block 41 and second blade block 42 float in different directions from each other, and the force for causing first blade block 41 and second blade block 42 to float can be used as the force for pressing skin S more efficiently. As a result, the adhesiveness of first blade block 41 and second blade block 42** to skin S can be further improved, and the body hair can be shaved more efficiently.

Figure 14:
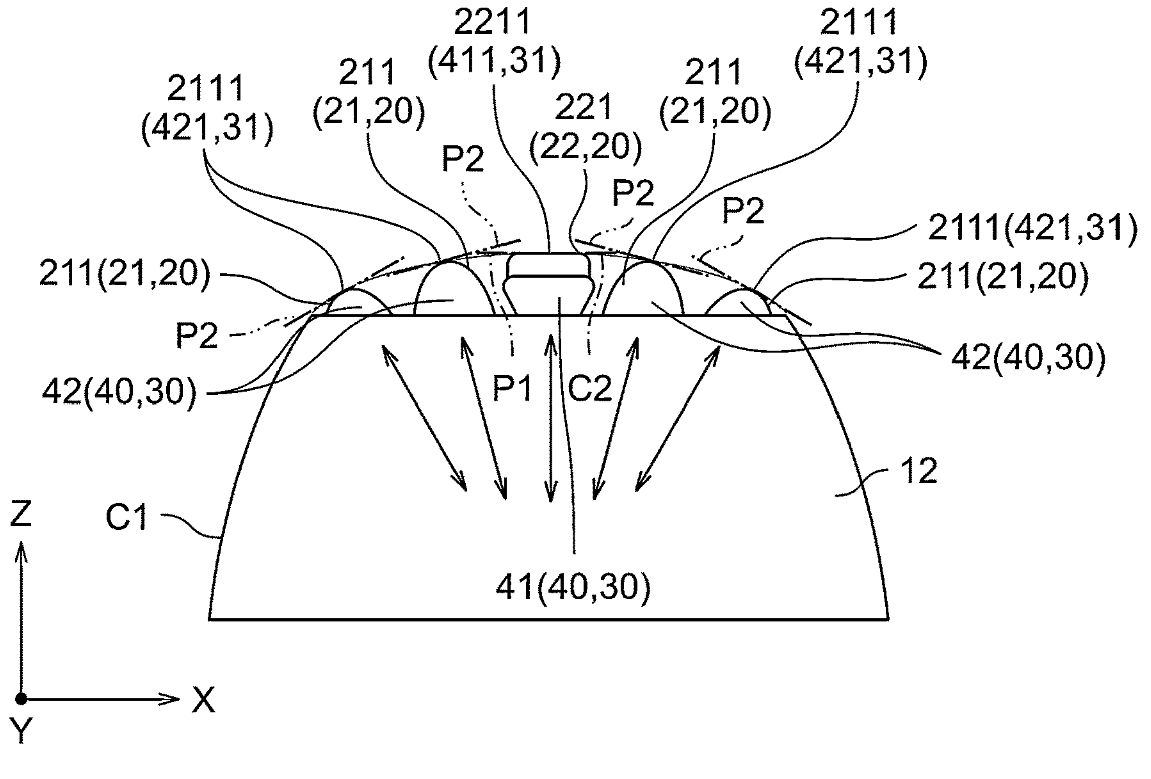
FIG. 14 is a side view schematically illustrating a floating state of the blade block with respect to the main body in a sixth modification.

Further, blade unit 20 illustrated in FIG. 14 can also be used. FIG. 14 is a side view schematically illustrating a floating state of blade block 22 with respect to head 12 (i.e., the main body) in a sixth modification.

In blade unit 20 illustrated in FIG. 14, four net blade blocks 21 and one slit blade block 22 are attached to outer blade case 23 in a state where the blade blocks can float in the Z direction (i.e., the up-down direction). That is, the plurality of blade blocks 30 (as an example, five blade blocks 30) are attached to outer blade case 23 in a state where the blade blocks can float in the Z direction (i.e., the up-down direction).

The plurality of blade blocks 30 (as an example, five blade blocks 30) includes more than or equal to three blade blocks 40 (as an example, five blade blocks 40) floatably held by head 12 (i.e., the main body).

Further, five blade blocks 30 (i.e., five blade blocks 40) include first blade block 41 floatably held by head 12 (i.e., the main body), and second blade block 42 held by head 12

(i.e., the main body) in such a manner that second blade block 42 floats in a direction intersecting the float direction of first blade block 41.

That is, five blade blocks 30 (i.e., five blade blocks 40) include first blade block 41 and second blade block 42 that float in different directions from each other.

Further, in blade unit 20 illustrated in FIG. 14, five blade blocks 40 include one first blade block 41 that floats in the vertical direction and four second blade blocks 42 that float in a direction inclined with respect to the vertical direction in a state where head 12 (i.e., one element of electric razor 1) is disposed such that skin contact surface 20*a* faces upward.

Specifically, slit blade block 22 at the center in FIG. 14 is defined as first blade block 41, and four net blade blocks 21 on the left and right sides in FIG. 14 are defined as second blade blocks 42. Therefore, in blade unit 20 illustrated in FIG. 14, the plurality of blade blocks 30 (as an example, five blade blocks 30) are held by head 12 (i.e., the main body) such that second blade blocks 42 are positioned on the outermost sides in the X direction (i.e., the first direction).

Further, the float direction of blade block 40 floatably held on the outermost side in the X direction (i.e., the first direction) corresponds to a direction inclined with respect to the direction (i.e., the Z direction) orthogonal to the X direction (i.e., the first direction).

Also in blade unit 20 shown in FIG. 14, second blade block 42 disposed on the outermost side in the X direction (i.e., the first direction) constitutes net blade block 21.

Further, also in blade unit 20 illustrated in FIG. 14, second blade block 42 is floated in such a manner that the second blade block 42 at a bottom dead center is brought closer to first blade block 41 than the second blade block 42 at a top dead center. That is, when second blade block 42 is moved from the top dead center toward the bottom dead center, top parts 421 of second blade blocks 42 move obliquely toward a central part in the X direction.

Specifically, when two second blade blocks 42 on the left side in FIG. 14 are moved from the top dead center toward the bottom dead center, top parts 421 of second blade blocks 42 move obliquely down and right toward the central part in the X direction. Further, when two second blade blocks 42 on the right side in FIG. 14 are moved from the top dead center toward the bottom dead center, top parts 421 of second blade blocks 42 move obliquely down and left toward the central part in the X direction.

Further, second blade block 42 disposed between second blade block 42 on the outermost side in the X direction (i.e., the first direction) and first blade block 41 is caused to float obliquely in a state where second blade block 42 disposed between second blade block 42 on the outermost side in the X direction (i.e., the first direction) and first blade block 41 is closer to the vertical direction than second blade block 42 on the outermost side in the X direction (i.e., the first direction).

As described above, also in blade unit 20 illustrated in FIG. 14, in a state where skin contact surface 20*a* faces upward, the float direction of five blade blocks 40 floatably held by head 12 (i.e., the main body) is brought closer to the vertical direction from the outer side toward the inner side in the X direction (i.e., the first direction).

Further, in blade unit 20 illustrated in FIG. 14, imaginary planes P2 including top parts 421 of four second blade blocks 42 on the left and right sides is substantially orthogonal to the float direction of second blade block 42. Further, imaginary plane P1 including top part 411 of first blade block 41 is also substantially orthogonal to the float direction of first blade block 41.

Here, in blade unit 20 illustrated in FIG. 14, in a state where head 12 (i.e., the main body) holding five blade blocks 40 is viewed in the direction (i.e., Y direction) intersecting the X direction (i.e., the first direction) and the float direction of first blade block 41, when five blade blocks 30 floatably held by head 12 (i.e., the main body) are located at the bottom dead center, each of top parts 31 of five blade blocks 30 is present along imaginary extension line C2 smoothly connecting outline C1 of head 12 (i.e., the main body).

When skin contact surface 20*a* of blade unit 20 having such a configuration is brought into contact with skin S (i.e., the skin surface) of the user, first blade block 41 and second blade block 42 float in different directions from each other, and skin contact surface 20*a* of blade unit 20 can have a shape that follows an uneven shape of skin S.

In the case of blade unit 20 described in the above exemplary embodiment and its modifications, float angle θ1 (see FIGS. 15 and 16, which will be described later) of blade block 40 arranged floatably on the outermost side in the X direction (i.e., the first direction) is preferably more than or equal to 14 degrees and less than or equal to 35 degrees.

Figure 15:
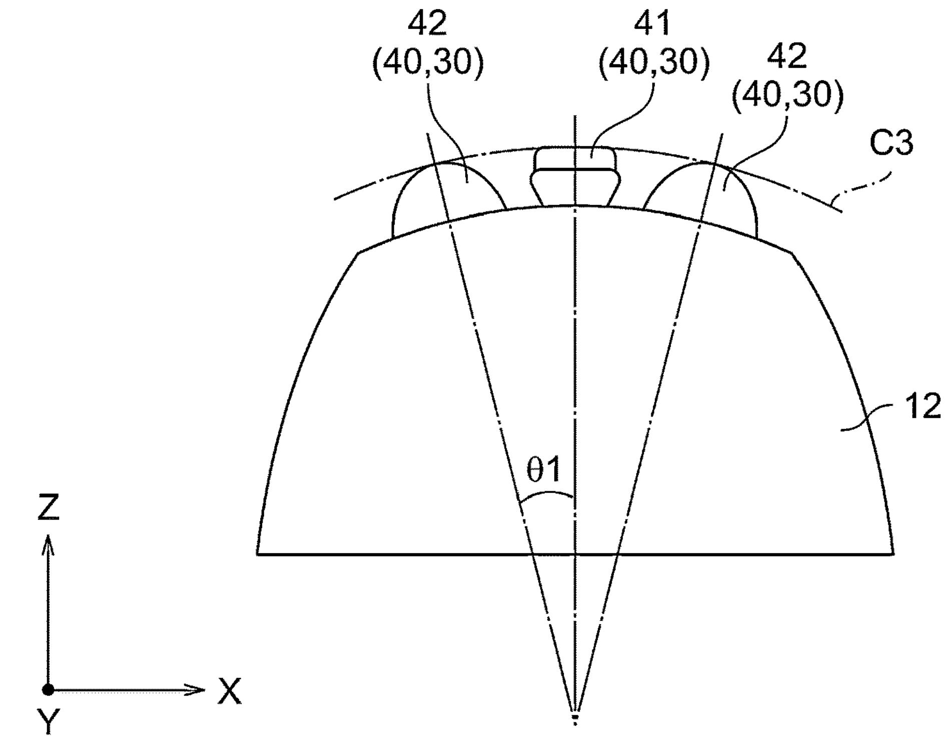
FIG. 15 is a diagram schematically illustrating a contact state between an arc approximating a curved state under the chin of an average adult male and three blade blocks held by the main body.

For example, when blade unit 20 in which three blade blocks 40 are arranged such that a width in the X direction is 10.4 mm is brought into contact with an inner side of arc C3 having a curvature radius of 25 mm symmetrically about the vertical line, as illustrated in FIG. 15, a straight line connecting a point at which blade block 40 on the outermost side in the X direction (i.e., the first direction) comes into contact with arc C3 and the center of arc C3 is a line inclined at about 14 degrees with respect to the vertical line. FIG. 15 is a diagram schematically illustrating a contact state between an arc approximating a curved state under the chin of an average adult male and three blade blocks 40 held by the main body.

Figure 16:
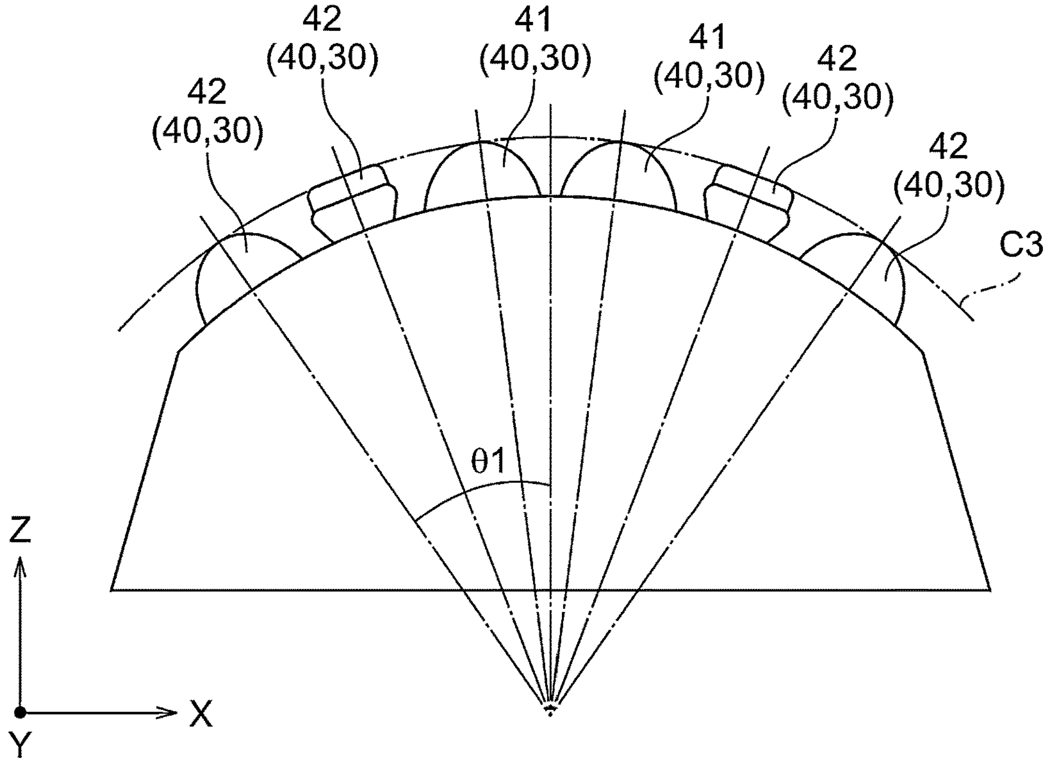
FIG. 16 is a diagram schematically illustrating a contact state between an arc approximating a curved state under the chin of an average adult male and six blade blocks held by the main body.

Further, when blade unit 20 in which six blade blocks 40 are arranged such that the width in the X direction is 26.0 mm is brought into contact with the inner side of arc C3 having a curvature radius of 25 mm symmetrically about the vertical line, as illustrated in FIG. 16, a straight line connecting a point at which blade block 40 on the outermost side in the X direction (i.e., the first direction) comes into contact with arc C3 and the center of arc C3 is a line inclined at about 35 degrees with respect to the vertical line. FIG. 16 is a diagram schematically illustrating a contact state between an arc approximating a curved state under the chin of an average adult male and six blade blocks 40 held by the main body.

Therefore, when blade unit 20 of three to six blades is brought into contact with the inner side of arc C3 having a curvature radius of 25 mm, it is possible to set angle θ1 between the straight line connecting the point at which blade block 40 on the outermost side in the X direction (i.e., the first direction) comes into contact with arc C3 and the center of arc C3 to fall within a range of about 14 degrees to 35 degrees.

If float angle θ1 of blade block 40 floatably arranged on the outermost side in the X direction (i.e., the first direction) is appropriately set between 14 degrees and 35 degrees, blade block 40 of blade unit 20 of three to six blades can be more effectively brought into close contact with the inner side of arc C3 having a curvature radius of 25 mm.

Here, an average curvature radius of a curved portion under the chin of an adult male is about 25 mm. Therefore, arc C3 having a curvature radius of 25 mm is a curve approximating the curved portion under the chin of an adult male.

For this reason, by setting float angle θ1 of blade block 40 floatably arranged on the outermost side in the X direction (i.e., the first direction) appropriately between 14 degrees and 35 degrees, when electric razor 1 of three to six blades is used, each blade block 40 can be brought into close contact with a curved state under the chin of an average adult male, and the body hair under the concave chin can be shaved more efficiently.

Actions and Effects

Hereinafter, a characteristic configuration of the blade unit and the electric razor described in each exemplary embodiment and the modification thereof, and an effect obtained by the characteristic configuration will be described.

Blade unit 20 described in the above-described exemplary embodiment and its modifications is held by head 12 (i.e., the main body) in a state where skin contact surface 20*a* is exposed. Blade unit 20 includes the plurality of blade blocks 30 held by head 12 (i.e., the main body) in such a manner that blade blocks 30 are aligned in the first direction.

The plurality of blade blocks 30 includes first blade block 41 floatably held by head 12 (i.e., the main body), and second blade block 42 held by head 12 (i.e., the main body) in such a manner that second blade block 42 floats in a direction intersecting the float direction of first blade block 41.

Further, electric razor 1 described in the exemplary embodiment and its modifications includes blade unit 20.

In this way, when blade unit 20 is in use (i.e., when electric razor 1 is in use), first blade block 41 and second blade block 42 float in different directions from each other, and skin contact surface 20*a* of blade unit 20 can have a shape that follows an uneven shape of skin S. As a result, the body hair of skin S can be shaved more efficiently.

As described above, by using blade unit 20 and electric razor 1 described in the exemplary embodiment and its modifications, the body hair can be shaved more efficiently even when skin S is uneven.

By causing first blade block 41 and second blade block 42 to float in different directions from each other, when blade unit 20 is in use (i.e., when electric razor 1 is in use), first blade block 41 and second blade block 42 can be brought into contact with skin S in a state in which first blade block 41 and second blade block 42 are floated in the direction substantially perpendicular to skin S. As described above, when the float direction of each of first blade block 41 and second blade block 42 is substantially perpendicular to skin S, the force for causing first blade block 41 and second blade block 42 to float can be used as the force for pressing skin S more efficiently, and thus the adhesiveness of first blade block 41 and second blade block 42 to skin S can be further improved. As a result, the body hair can be shaved more efficiently.

Further, second blade block 42 may float in such a manner that the second blade block at a bottom dead center is brought closer to first blade block 41 than the second blade block at a top dead center.

In this way, skin contact surface 20*a* of blade unit 20 can have a shape following the concave shape of skin S, and the body hair of skin S can be shaved more efficiently.

Further, second blade block 42 may float in such a manner that the second blade block 42 at the top dead center is brought closer to first blade block 41 than the second blade block 42 at the bottom dead center.

In this way, skin contact surface 20*a* of blade unit 20 can have a shape following the convex shape of skin S, and the body hair of skin S can be shaved more efficiently.

Further, imaginary plane P2 including top part 421 of second blade block 42 may be substantially orthogonal to the float direction of second blade block 42.

In this way, top part 421 of second blade block 42 can more reliably press skin S even when skin S has irregularities, and thus the adhesiveness of second blade block 42 to skin S can be further improved. As a result, the body hair can be shaved more efficiently.

The plurality of blade blocks 30 may be held by head 12 (i.e., the main body) such that second blade block 42 is positioned on the outermost side in the X direction (i.e., the first direction).

In this way, the float direction of blade block 40 floatably held on the outermost side in the X direction (i.e., the first direction) can be set to a direction inclined with respect to the direction (i.e., the Z direction) orthogonal to the X direction (i.e., the first direction). As a result, the force for causing blade block 40 to float can be used as the force for pressing blade block 40 against skin S more efficiently, and therefore the adhesiveness of second blade block 42 to skin S can be further improved, and the body hair can be shaved more efficiently.

Second blade block 42 disposed on the outermost side in the X direction (i.e., the first direction) may be slit blade block 22 having substantially flat top surface 2211.

In this way, the force for causing slit blade block 22 to float can be used as the force for pressing against skin S more efficiently, and thus the adhesiveness of slit blade block 22 to skin S can be further improved. Therefore, the function of slit blade block 22 can be further exhibited.

Second blade block 42 disposed on the outermost side in the X direction (i.e., the first direction) may be net blade block 21.

In this way, the force for causing net blade block 21 to float can be used as the force for pressing against skin S more efficiently, and thus the adhesiveness of net blade block 21 to skin S can be further improved. Therefore, the function of net blade block 21 can be further exhibited.

In a state where head 12 (i.e., the main body) holding the plurality of blade blocks 30 is viewed in the direction (i.e., the Y direction) intersecting the X direction (i.e., the first direction) and the float direction of first blade block 41, top part 421 may be present along imaginary extension line C2 smoothly connecting outline C1 of head 12 (i.e., the main body), when second blade block 42 is located at the bottom dead center.

In this way, it is possible to more reliably suppress the irritation at skin S by second blade block 42 when second blade block 42 is slid in the X direction (i.e., the first direction) while second blade block 42 is in contact with skin S when blade unit 20 is in use (i.e., when electric razor 1 is in use).

Further, the plurality of blade blocks 30 may include more than or equal to three blade blocks 40 floatably held by head 12 (i.e., the main body). In a state where head 12 (i.e., the main body) holding the plurality of blade blocks 30 is disposed such that skin contact surface 20*a* faces upward, float directions of more than or equal to three blade blocks 40 floatably held by head 12 (i.e., the main body) may be brought closer to the vertical direction from the outer side toward the inner side in the X direction (i.e., the first direction).

In this way, it is possible to cause all of more than or equal to three blade blocks 40 floatably held by head 12 (i.e., the main body) to float more efficiently. As a result, the float force of all of more than or equal to three blade blocks 40 can be more efficiently used as the force for pressing against skin S, and the body hair present on skin S having an uneven shape can be more efficiently shaved. In addition, an effect similar to the above-described effect can be obtained regardless of the direction in which the slit blade block 22 is slid in the X direction (i.e., the first direction), when slit blade block 22 is slid in the X direction (i.e., the first direction) while blade block 22 is brought into contact with skin S during use of blade unit 20 (i.e., during use of electric razor 1).

Further, in a state where head 12 (i.e., the main body) holding the plurality of blade blocks 40 is viewed in the direction (i.e., Y direction) intersecting the X direction (i.e., the first direction) and the float direction of first blade block 41, when more than or equal to three blade blocks 30 floatably held by head 12 (i.e., the main body) are located at the bottom dead center, each of top parts 31 of the plurality of blade blocks 30 may be present along imaginary extension line C2 smoothly connecting outline C1 of head 12 (i.e., the main body).

In this way, it is possible to make all of more than or equal to three blade blocks 40 floatably held by head 12 (i.e., the main body) follow the uneven shape of skin S when blade unit 20 is in use (i.e., when electric razor 1 is in use). As a result, it is possible to bring all of more than or equal to three blade blocks 40 into closer contact with skin S, and to more efficiently shave the body hair even when skin S is uneven.

The plurality of blade blocks 30 may include more than or equal to three and less than or equal to six blade blocks 30, and more than or equal to three and less than or equal to six blade blocks 30 may include blade block 40 floatably held by head 12 (i.e., the main body) on the outermost side in the X direction (i.e., the first direction). In a state where head 12 (i.e., the main body) holding more than or equal to three and less than or equal to six blade blocks 30 is disposed such that skin contact surface 20*a* faces upward, the angle between the Z direction (i.e., the vertical direction) and the float direction of blade block 40 floatably held by head 12 (i.e., the main body) on the outermost side in the X direction (i.e., the first direction) may be more than or equal to 14 degrees and less than or equal to 35 degrees.

In this manner, when electric razor 1 of three to six blades is used, blade block 30 can float so as to follow a curved state under the chin of an average adult male, so that the concave the body hair under his/her chin can be shaved more efficiently.

Others

Although the contents of the slit blade block and the electric razor according to the present disclosure have been described above, the present disclosure is not limited to these descriptions, and it is obvious to those skilled in the art that various modifications and improvements can be made.

For example, the present disclosure can be applied to exemplary embodiments in which changes, replacements, additions, omissions, and the like of the configurations described in the above exemplary embodiment and the modifications thereof are made. Furthermore, it is also possible to make a new exemplary embodiment by combining the constituent elements described in the above exemplary embodiment and its modifications.

In the exemplary embodiment and its modifications, electric razor 1 including grip 11 and head 12 is exemplified, but the present disclosure is also applicable to an electric razor provided with no head part. In this case, a side of the razor body on which the blade unit is supported is a portion corresponding to the main body.

In the exemplary embodiment and its modifications, all of the plurality of blade blocks 30 are blade blocks 40 floatably held by head 12 (i.e., the main body). However, the plurality of blade blocks 30 may include a blade block non-floatably held by head 12 (i.e., the main body). In this case, the blade block non-floatably held by head 12 (i.e., the main body) is preferably held by head 12 (i.e., the main body) such that the non-floatably held blade block does not have to protrude more than blade block 40, when blade block 40 floatably held by head 12 (i.e., the main body) is positioned at the bottom dead center.

In the exemplary embodiment and its modifications, when imaginary plane P2 including top part 421 of second blade block 42 disposed on the outermost side in the X direction (i.e., the first direction) is substantially orthogonal to the float direction of second blade block 42, top parts 421 are present along imaginary extension line C2 smoothly connecting outline C1 of head 12 (i.e., the main body) at the bottom dead center. However, the present invention is not limited to such a configuration, and although imaginary plane P2 including top part 421 of second blade block 42 disposed on the outermost side in the X direction (i.e., the first direction) is substantially orthogonal to the float direction of second blade block 42, top part 421 does not have to be present along imaginary extension line C2 smoothly connecting outline C1 of head 12 (i.e., the main body) at the bottom dead center.

Further, it is possible to provide a configuration in which imaginary plane P2 including top part 421 of second blade block 42 disposed on the outermost side in the X direction (i.e., the first direction) is not substantially orthogonal to the float direction of second blade block 42, but top part 421 is present along imaginary extension line C2 smoothly connecting outline C1 of head 12 (i.e., the main body) at the bottom dead center.

In addition, blade unit 20 may include two blade blocks 30, or blade unit 20 may include more than or equal to seven blade blocks 30. Even in this case, the arrangement order of the respective blade blocks can be appropriately set.

Specifications (shape, size, layout, and the like) of the blade block, the main body, and other details can be changed as appropriate.

INDUSTRIAL APPLICABILITY

As described above, with the blade unit and the electric razor according to the present disclosure, it is possible to more efficiently shave the body hair even when skin is uneven, and therefore the blade unit and the electric razor according to the present disclosure can be applied not only to beards but also to various body hair treatments.

REFERENCE MARKS IN THE DRAWINGS

1: electric razor
10: razor body
11: grip
111: body housing
111*a*: power supply switch
12: head
121: head main body

121*a*: release button
122: head cover
122*a*: upper opening
122*b*: lower opening
122*c*: peripheral wall
13: drive pole
20: blade unit
200: outer blade cassette
20*a*: skin contact surface
21: net blade block
211: first net blade
2111: vertex
212: first inner blade
22: slit blade block
221: outer slit blade
2211: top surface
23: outer blade case
23*a*: release button
30: blade block
31: top part
40: floatable blade block
41: first blade block
411: top part
42: second blade block
421: top part
C1: outline of main body
C2: extension line
C3: arc
P1: imaginary plane
P2: imaginary plane
S: skin
S1: concave surface
S2: convex surface
X: first direction
θ1: angle

The invention claimed is:

1. A blade unit held by a main body in a state where a skin contact surface is exposed, the blade unit comprising:
a plurality of blade blocks held by the main body, wherein:
the plurality of the blade blocks are disposed side by side in a first direction,
the plurality of the blade blocks comprise:
a first blade block floatably held by the main body; and
a second blade block held by the main body,
the second blade block floats in a direction intersecting a float direction of the first blade block, and
the second blade block at a bottom dead center is brought closer to the first blade block than the second blade block at a top dead center.

2. The blade unit according to claim 1, wherein
an imaginary plane including a top part of the second blade block is substantially orthogonal to a float direction of the second blade block.

3. The blade unit according to claim 1, wherein
the plurality of the blade blocks are held by the main body such that the second blade block is positioned on an outermost side in the first direction.

4. The blade unit according to claim 3, wherein
the second blade block disposed on the outermost side in the first direction is a slit blade block having a substantially flat top surface.

5. The blade unit according to claim 3, wherein
the second blade block disposed on the outermost side in the first direction is a net blade block.

6. The blade unit according to claim 4, wherein
in a state where the main body holding the plurality of the blade blocks is viewed along a direction intersecting the first direction and the float direction of the first blade block, when the second blade block is positioned at the bottom dead center, a top part of the second blade block is present along an imaginary extension line smoothly connecting an outline of the main body.

7. The blade unit according to claim 1, wherein
the plurality of the blade blocks comprise more than or equal to three blade blocks floatably held by the main body, and
in a state where the main body holding the plurality of the blade blocks is disposed such that the skin contact surface faces upward, float directions of the more than or equal to three blade blocks floatably held by the main body are brought closer to a vertical direction from an outer side of the first direction toward an inner side of the first direction.

8. The blade unit according to claim 7, wherein
in a state where the main body holding the plurality of the blade blocks is viewed along a direction intersecting the first direction and the float direction of the first blade block, when the more than or equal to three blade blocks floatably held by the main body are positioned at a bottom dead center, top parts of the plurality of the blade blocks are present along an imaginary extension line smoothly connecting an outline of the main body.

9. The blade unit according to claim 1, wherein
the plurality of the blade blocks comprise more than or equal to three and less than or equal to six blade blocks,
the more than or equal to three and less than or equal to six blade blocks comprise a blade block floatably held by the main body on an outermost side in the first direction, and
in a state where the main body holding the more than or equal to three and less than or equal to six blade blocks is disposed such that the skin contact surface faces upward, an angle between the float direction of the blade block floatably held by the main body on the outermost side in the first direction and a vertical direction is more than or equal to 14 degrees and less than or equal to 35 degrees.

10. An electric razor comprising the blade unit according to claim 1.

11. A blade unit held by a main body in a state where a skin contact surface is exposed, the blade unit comprising:
a plurality of blade blocks held by the main body, wherein:
the plurality of the blade blocks are disposed side by side in a first direction,
the plurality of the blade blocks comprise:
a first blade block floatably held by the main body; and
a second blade block held by the main body,
the second blade block floats in a direction intersecting a float direction of the first blade block,
the plurality of the blade blocks comprise more than or equal to three blade blocks floatably held by the main body, and
in a state where the main body holding the plurality of the blade blocks is disposed such that the skin contact surface faces upward, float directions of the more than or equal to three blade blocks floatably held by the main body are brought closer to a vertical direction from an outer side of the first direction toward an inner side of the first direction.

12. The blade unit according to claim 11, wherein in a state where the main body holding the plurality of the blade blocks is viewed along a direction intersecting the first direction and the float direction of the first blade block, when the more than or equal to three blade blocks floatably held by the main body are positioned at a bottom dead center, top parts of the plurality of the blade blocks are present along an imaginary extension line smoothly connecting an outline of the main body.

* * * * *